US007008748B1

(12) United States Patent
Hasberg et al.

(10) Patent No.: US 7,008,748 B1
(45) Date of Patent: Mar. 7, 2006

(54) SILVER SALT-TONER CO-PRECIPITATES AND IMAGING MATERIALS

(75) Inventors: Dirk J. Hasberg, Rochester, NY (US); Doreen C. Lynch, Afton, MN (US); Kui Chen-Ho, Woodbury, MN (US); Chaofeng Zou, Maplewood, MN (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/935,384

(22) Filed: Sep. 7, 2004

(51) Int. Cl.

| | |
|---|---|
| ***G03C 1/498*** | (2006.01) |
| ***G03C 1/46*** | (2006.01) |
| ***G03C 5/17*** | (2006.01) |
| ***G03C 1/35*** | (2006.01) |
| ***C07F 7/22*** | (2006.01) |

(52) U.S. Cl. ...................... 430/139; 430/353; 430/502; 430/618; 430/619; 430/964; 430/965; 503/210; 548/105; 556/117

(58) Field of Classification Search ................ 430/618, 430/619, 964, 965, 139, 502, 353; 548/105, 548/108; 556/117; 503/210
See application file for complete search history.

(56) References Cited

U.S. PATENT DOCUMENTS

| | | | | |
|---|---|---|---|---|
| 3,832,186 | A | 8/1974 | Masuda et al. | |
| 4,105,451 | A | 8/1978 | Smith et al. | |
| 4,201,582 | A | 5/1980 | White | |
| 4,451,561 | A | 5/1984 | Hirabayashi et al. | |
| 4,543,309 | A | 9/1985 | Hirabayashi et al. | |
| 6,355,408 | B1 | 3/2002 | Whitcomb et al. | |
| 6,426,181 | B1 | 7/2002 | Irving et al. | |
| 6,497,999 | B1 | 12/2002 | Bryant et al. | |
| 6,548,236 | B1 | 4/2003 | Irving et al. | |
| 6,576,410 | B1 | 6/2003 | Zou et al. | |
| 6,576,411 | B1 | 6/2003 | Irving et al. | |
| 6,576,414 | B1 | 6/2003 | Irving | |
| 6,605,418 | B1 * | 8/2003 | Ramsden et al. | 430/350 |
| 6,713,240 | B1 | 3/2004 | Lynch et al. | |
| 6,770,428 | B1 | 8/2004 | Maskasky et al. | |
| 6,841,343 | B1 * | 1/2005 | Lynch et al. | 430/350 |

FOREIGN PATENT DOCUMENTS

| | | |
|---|---|---|
| JP | 441969-26582 | 11/1969 |
| JP | 21990-34370 | 8/1990 |

* cited by examiner

*Primary Examiner*—Richard L. Schilling
(74) *Attorney, Agent, or Firm*—J. Lanny Tucker; Louis M. Leichter

(57) ABSTRACT

Thermally developable materials such as thermographic and photothermographic materials include a co-precipitate comprising first and second organic silver salts, the first organic silver salt comprising a silver salt of a nitrogen-containing heterocyclic compound containing an imino group, and the second organic silver salt comprising a silver salt of a mercaptotriazole. The first organic silver salt can be used in the imaging process as a source of reducible silver ions, and the second organic silver salt can be a source of a toning agent. The co-precipitate can be prepared using double-jet precipitation techniques to provide an aqueous dispersion that can be used in imaging formulations.

47 Claims, No Drawings

SILVER SALT-TONER CO-PRECIPITATES AND IMAGING MATERIALS

FIELD OF THE INVENTION

This invention relates to co-precipitates in the form of nano-crystals or particles containing two or more of specific organic silver salts. This invention also relates to a method of making these co-precipitates and to their use in thermally developable materials such as thermographic and photothermographic materials. It also relates to methods of forming images using the thermally developable materials.

BACKGROUND OF THE INVENTION

Silver-containing photothermographic imaging materials (that is, thermally developable photosensitive imaging materials) that are imaged with actinic radiation and then developed using heat and without liquid processing have been known in the art for many years. Such materials are used in a recording process wherein an image is formed by imagewise exposure of the photothermographic material to specific electromagnetic radiation and developed by the use of thermal energy. These materials, also known as "dry silver" materials, generally comprise a support having coated thereon: (a) a photocatalyst (that is, a photosensitive compound such as silver halide) that upon such exposure provides a latent image in exposed grains that are capable of acting as a catalyst for the subsequent formation of a silver image in a development step, (b) a relatively or completely non-photosensitive source of reducible silver ions, (c) a reducing composition (usually including a developer) for the reducible silver ions, and (d) a hydrophilic or hydrophobic binder. The latent image is then developed by application of thermal energy.

In photothermographic materials, exposure of the photographic silver halide to light produces small clusters containing silver atoms $(Ag^0)_n$. The imagewise distribution of these clusters, known in the art as a latent image, is generally not visible by ordinary means. Thus, the photosensitive material must be further developed to produce a visible image by the reduction of silver ions that are in catalytic proximity to silver halide grains bearing the silver-containing clusters of the latent image. This produces a black-and-white image. The non-photosensitive silver source is catalytically reduced to form the visible black-and-white negative image while much of the silver halide, generally, remains as silver halide and is not reduced. In most instances, the source of reducible silver ions is an organic silver salt in which silver ions are complexed with organic silver coordinating ligands.

Thermographic materials are similar in nature except that the photocatalyst is omitted and imaging and development are carried out simultaneously using a thermal imaging means. Such materials also include an organic silver salt that provides reducible silver ions required for imaging.

Differences Between Photothermography and Photography

The imaging arts have long recognized that the field of photothermography is clearly distinct from that of photography. Photothermographic materials differ significantly from conventional silver halide photographic materials that require processing with aqueous processing solutions.

In photothermographic imaging materials, a visible image is created by heat as a result of the reaction of a developer incorporated within the material. Heating at 50° C. or more is essential for this dry development. In contrast, conventional photographic imaging materials require processing in aqueous processing baths at more moderate temperatures (from 30° C. to 50° C.) to provide a visible image.

In photothermographic materials, only a small amount of silver halide is used to capture light and a non-photosensitive source of reducible silver ions (for example a silver carboxylate or a silver benzotriazole) is used to generate the visible image using thermal development. Thus, the imaged photosensitive silver halide serves as a catalyst for the physical development process involving the non-photosensitive source of reducible silver ions and the incorporated reducing agent. In contrast, conventional wet-processed, black-and-white photographic materials use only one form of silver (that is, silver halide) that, upon chemical development, is itself at least partially converted into the silver image, or that upon physical development requires addition of an external silver source (or other reducible metal ions that form black images upon reduction to the corresponding metal). Thus, photothermographic materials require an amount of silver halide per unit area that is only a fraction of that used in conventional wet-processed photographic materials.

In photothermographic materials, all of the "chemistry" for imaging is incorporated within the material itself. For example, such materials include a developer (that is, a reducing agent for the reducible silver ions) while conventional photographic materials usually do not. Even in so-called "instant photography," the developer chemistry is physically separated from the photosensitive silver halide until development is desired. The incorporation of the developer into photothermographic materials can lead to increased formation of various types of "fog" or other undesirable sensitometric side effects. Therefore, much effort has gone into the preparation and manufacture of photothermographic materials to minimize these problems.

Moreover, in photothermographic materials, the unexposed silver halide generally remains intact after development and the material must be stabilized against further imaging and development. In contrast, silver halide is removed from conventional photographic materials after solution development to prevent further imaging (that is in the aqueous fixing step).

Because photothermographic materials require dry thermal processing, they present distinctly different problems and require different materials in manufacture and use, compared to conventional, wet-processed silver halide photographic materials. Additives that have one effect in conventional silver halide photographic materials may behave quite differently when incorporated in photothermographic materials where the chemistry is significantly more complex. The incorporation of such additives as, for example, stabilizers, antifoggants, speed enhancers, supersensitizers, and spectral and chemical sensitizers in conventional photographic materials is not predictive of whether such additives will prove beneficial or detrimental in photothermographic materials. For example, it is not uncommon for a photographic antifoggant useful in conventional photographic materials to cause various types of fog when incorporated into photothermographic materials, or for supersensitizers that are effective in photographic materials to be inactive in photothermographic materials.

These and other distinctions between photothermographic and photographic materials are described in *Imaging Processes and Materials* (*Neblette's Eighth Edition*), noted above, *Unconventional Imaging Processes*, E. Brinckman et al. (Eds.), The Focal Press, London and New York, 1978, pp.

74–75, in Zou et al., *J. Imaging Sci. Technol.* 1996, 40, pp. 94–103, and in M. R. V. Sahyun, *J. Imaging Sci. Technol.* 1998, 42, 23.

Problem to be Solved

As noted above, non-photosensitive sources of reducible silver ions are critical to the imaging mechanism of both photothermographic and thermographic materials. Various organic silver salts are useful for this purpose including silver carboxylates (both aliphatic and aromatic), silver salts of nitrogen-containing heterocyclic compounds, silver sulfonates, and many others known in the art as described for example in U.S. Pat. No. 6,576,410 (Zou et al.).

Aqueous-based photothermographic materials have been known for many years in which the imaging components and binders are formulated in and coated from solvents comprising primarily water. It has been necessary in designing such materials that the various imaging components be compatible with water and other water-soluble or -dispersible components. Silver benzotriazole has been found particularly useful in aqueous-based materials because of the hydrophilic nature of silver benzotriazole crystal surfaces and its compatability with most water-soluble binders.

One challenge in photothermographic materials is the need to prevent image artifacts known as "black spots" after thermal development. Black spots are believed to be caused by crystallization of active toners or agglomeration of toner particles during dispersion, melt preparation, coating, and drying of thermographic and photothermographic materials. Upon thermal development, the local concentration of active toner where these toner particles reside is so high as to cause spontaneous development in the non-imaged areas, resulting in high-density black spots.

Another challenge in photothermographic materials is the need to improve their stability after use. This is referred to as "Archival Stability" or "Dark Stability." It is desirable that the Dmin not increase, and that the Dmax, tint, and tone of the image not change.

A further challenge in photothermographic materials is the need to improve their stability at ambient temperature and relative humidity during storage prior to use. This stability is referred to as "Natural Age Keeping" (NAK) or as "Raw Stock Keeping" (RSK). It is desirable that photothermographic materials be capable of maintaining imaging properties, including photospeed and Dmax, while minimizing any increase in Dmin during storage periods. Natural Age Keeping is a problem especially for photothermographic films compared to conventional silver halide photographic films because, as noted above, all the components needed for development and image formation in photothermographic systems are incorporated into the imaging element, in intimate proximity, prior to development. Thus, there are a greater number of potentially reactive components that can prematurely react during storage.

Mercaptotriazoles have been described for use as toners in photothermographic materials in U.S. Pat. No. 3,832,186 (Masuda et al.), U.S. Pat. No. 4,201,582 (White), U.S. Pat. No. 4,105,451 (Smith et al.), and U.S. Pat. No. 6,713,240 (Lynch et al.). The mercaptotriazoles described in U.S. Pat. No. 6,713,240 are especially useful toners (or toning agents) and development accelerators for photothermographic materials.

Mercaptotriazoles suitable for thermally developable imaging materials often have poor water solubility and cause undesirable precipitation when added to aqueous-based imaging formulations, thereby adversely affecting coating quality and density uniformity.

Moreover, the presence of such toners in photothermographic materials during storage before use also may accelerate the increase in Dmin. Thus, photothermographic materials that include large quantities of mercaptotriazole toners to accelerate the development reaction may be susceptible to keeping problems, leading to reduced "NAK."

U.S. Pat. Nos. 6,576,414 (Irving et al.) and 6,548,236 (Irving et al.) describe both color and black-and-white photothermographic materials containing core/shell particles having two or more different organic silver salts. The particles function as silver sources.

There remains a need to effectively incorporate specific organic silver salts and mercaptotriazole toners into aqueous-based photothermographic imaging formulations and materials so that formation of black spots is reduced and sensitometric properties are not changed during Natural Age Keeping, and so that Archival Stability is improved, all without sacrifice of desired photospeed and other sensitometric properties.

SUMMARY OF THE INVENTION

This invention provides a co-precipitate particle comprising first and second organic silver salts, the first organic silver salt comprising a silver salt of a nitrogen-containing heterocyclic compound containing an imino group, and the second organic silver salt comprising a silver salt of a mercaptotriazole, wherein the second organic silver salt comprises a silver salt of a mercaptotriazole having the following Structure (I):

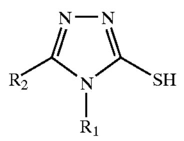

(I)

wherein $R_1$ and $R_2$ independently represent hydrogen, an alkyl group, an alkenyl group, a cycloalkyl group, an aromatic or non-aromatic heterocyclyl group, an amino or amide group, an aryl group, or a $Y_1-(CH_2)_k-$ group wherein $Y_1$ is an aryl group or an aromatic or non-aromatic heterocyclyl group, and k is 1–3, or $R_1$ and $R_2$ taken together can form a 5- to 7-membered aromatic or non-aromatic nitrogen-containing heterocyclic ring, or still again, $R_1$ or $R_2$ can represent a divalent linking group linking two mercaptotriazole groups, and $R_2$ may further represent carboxy or its salts, provided that $R_1$ and $R_2$ are not simultaneously hydrogen, and when $R_1$ is an unsubstituted phenyl group, $R_2$ is not hydrogen.

Preferred embodiments comprise a co-precipitate particle comprising first and second organic silver salts, the first organic silver salt comprising a silver salt of a benzotriazole, and the second organic silver salt comprising a silver salt of a mercaptotriazole represented by Structure (I) noted above, wherein $R_1$ is an alkyl or phenyl group and $R_2$ is hydrogen, provided that when $R_1$ is an unsubstituted phenyl group, $R_2$ is not hydrogen, and wherein the molar ratio of the first organic silver salt to the second organic silver salt is from about 100:1 to about 15:1, and at least 95 mol % of the second organic silver salt is present within a localized portion that is from about 90 to 100 volume % of the co-precipitate particle wherein 100 volume % represents the outer surface of the co-precipitate particle.

This invention also provides a method of making a co-precipitate particle of first and second organic silver salts, the first organic silver salt comprising a silver salt of a nitrogen-containing heterocyclic compound containing an imino group, and the second organic silver salt comprising a silver salt of a mercaptotriazole, the method comprising:

A) preparing aqueous solution A containing a nitrogen-containing heterocyclic compound containing an imino group, A') preparing aqueous solution A' containing a mercaptotriazole, wherein solutions A and A' are the same or different solutions, B) preparing aqueous solution B of silver nitrate, and C) simultaneously adding the aqueous solutions A and B to a reaction vessel containing an aqueous dispersion of a hydrophilic polymer binder or a water-dispersible polymer latex binder that has a pH of from about 7.5 to about 10, via controlled double-jet precipitation, while maintaining a constant temperature of from about 30 to about 75° C., a constant pH, and a constant vAg equal to or greater than −50 mV in the reaction vessel, and E) adding solution A', if different from solution A, to the reaction vessel during or after step C while maintaining a constant temperature of from about 30 to about 75° C., a constant pH, and a constant vAg equal to or greater than −50 mV in the reaction vessel, thereby preparing in the reaction vessel a dispersion of the hydrophilic polymer binder or the water-dispersible polymer latex binder and particles of a co-precipitate particle of the first and second silver salts, and the hydrophilic polymer binder or the water-dispersible polymer latex binder being present in the dispersion in an amount of from about 2 to about 10 weight %, wherein the second organic silver salt comprises a silver salt of a mercaptotriazole having Structure (I) noted above.

Preferred embodiments of this method of making the co-precipitate comprise:

A) preparing aqueous solution A containing a nitrogen-containing heterocyclic compound containing an imino group at a concentration of from about 2 to about 4 mol/l, A') preparing aqueous solution A' that is different from solution A and contains a mercaptotriazole of Structure (I) at a concentration of from about 0.5 to about 3 mol/l, B) preparing aqueous solution B of silver nitrate, and C) simultaneously adding aqueous solutions A and B to a reaction vessel containing an aqueous dispersion of a hydrophilic polymer binder or a water-dispersible polymer latex binder that has a pH of from about 7.5 to about 10, via controlled double-jet precipitation, while maintaining a constant temperature of from about 30 to about 75° C., a constant pH, and a constant vAg equal to or greater than −50 mV in the reaction vessel, E) adding solution A' to the reaction vessel during step C but only after at least 75 volume % of solution B has been added to the reaction vessel, thereby preparing in the reaction vessel a dispersion of the hydrophilic polymer binder or the water-dispersible polymer latex binder and particles of the co-precipitate of the first and second organic silver salts, and the hydrophilic polymer binder or the water-dispersible polymer latex binder being present in the dispersion in an amount of from about 2 to about 10 weight %.

This invention also provides a black-and-white, non-photosensitive thermographic material comprising a support and having thereon at least one non-photosensitive thermally developable imaging layer comprising a hydrophilic polymer binder or a water-dispersible polymer latex binder and in reactive association:

a. a non-photosensitive source of reducible silver ions, and b. a reducing agent for the reducible silver ions, wherein the non-photosensitive source of reducible silver ions predominantly comprises a co-precipitate particle comprising first and second organic silver salts, the first organic silver salt comprising a silver salt of a nitrogen-containing heterocyclic compound containing an imino group, and the second organic silver salt comprising a silver salt of a mercaptotriazole.

In addition, a black-and-white photothermographic material comprising a support and having thereon at least one thermally developable imaging layer comprising a hydrophilic polymer binder or a water-dispersible polymer latex binder and in reactive association:

a. a photosensitive silver halide that is spectrally sensitized to a wavelength of from about 300 to about 450 nm, b. a non-photosensitive source of reducible silver ions, and c. a reducing agent for the reducible silver ions, wherein the non-photosensitive source of reducible silver ions predominantly comprises a co-precipitate particle comprising first and second organic silver salts, the first organic silver salt comprising a silver salt of a nitrogen-containing heterocyclic compound containing an imino group, and the second organic silver salt comprising a silver salt of a mercaptotriazole.

In addition, a black-and-white photothermographic material of this invention comprises a support and having thereon at least one thermally developable imaging layer comprising a hydrophilic polymer binder or a water-dispersible polymer latex binder and in reactive association:

a. a photosensitive silver halide, b. a non-photosensitive source of reducible silver ions, and c. a reducing agent for the reducible silver ions, wherein the non-photosensitive source of reducible silver ions predominantly comprises a co-precipitate particle comprising first and second organic silver salts, the first organic silver salt comprising a silver salt of a nitrogen-containing heterocyclic compound containing an imino group, and the second organic silver salt comprising a silver salt of a mercaptotriazole, wherein the second organic silver salt comprises a silver salt of a mercaptotriazole having Structure (I) noted above.

Still again, a black-and-white photothermographic material of this invention comprises a support and having thereon at least one thermally developable imaging layer-comprising a hydrophilic polymer binder or a water-dispersible polymer latex binder and in reactive association:

a. a photosensitive silver halide present as ultrathin tabular grains, b. a non-photosensitive source of reducible silver ions, and c. a reducing agent for the reducible silver ions, wherein the non-photosensitive source of reducible silver ions comprises a co-precipitate particle comprising first and second organic silver salts, the first organic silver salt comprising a silver salt of a nitrogen-containing heterocyclic compound containing an imino group, and the second organic silver salt comprising a silver salt of a mercaptotriazole.

In preferred embodiments, a black-and-white photothermographic material comprises a support having on a frontside thereof, a) one or more frontside thermally developable imaging layers comprising a hydrophilic polymer binder or a water-dispersible polymer latex binder, and in reactive association, a photosensitive silver halide, a non-photosensitive source of reducible silver ions, and a reducing agent for the non-photosensitive source reducible silver ions, b) the material comprising on the backside of the support, one or more backside thermally developable imaging layers having the same or different composition as the frontside thermally developable imaging layers, and c) optionally, an outermost protective layer disposed over the one or more thermally developable imaging layers on either or both sides of the support, wherein the non-photosensitive source of reducible silver ions comprises a co-precipitate particle comprising first and second organic silver salts, the first organic silver salt comprising a silver salt of a nitrogen-containing heterocyclic compound containing an imino group, and the second organic silver salt comprising a silver salt of a mercaptotriazole.

In still other embodiments of this invention a black-and-white photothermographic material comprises a support and has therein at least one thermally developable imaging layer comprising a hydrophilic polymer binder or a water-dispersible polymer latex binder and in reactive association:

a. a photosensitive silver halide present as ultrathin tabular grains, b. a non-photosensitive source of reducible silver ions, and c. a reducing agent for the reducible silver ions, wherein the non-photosensitive source of reducible silver ions comprises a co-precipitate particle comprising first and second organic silver salts, the first organic silver salt comprising a silver salt of a nitrogen-containing heterocyclic compound containing an imino group, and the second organic silver salt comprising a silver salt of a mercaptotriazole, and wherein at least part of the outer surface of the co-precipitate particle is covered by the second organic silver salt.

Yet again, other embodiments include a black-and-white photothermographic material comprising a support having on a frontside thereof, a) one or more frontside thermally developable imaging layers comprising a hydrophilic polymer binder or a water-dispersible polymer latex binder, and in reactive association, a photosensitive silver halide, a non-photosensitive source of reducible silver ions, and a reducing agent for the non-photosensitive source reducible silver ions, b) the material comprising on the backside of the support, one or more backside thermally developable imaging layers having the same or different composition as the frontside thermally developable imaging layers, and c) optionally, an outermost protective layer disposed over the one or more thermally developable imaging layers on either or both sides of the support, wherein the non-photosensitive source of reducible silver ions comprises a co-precipitate particle comprising first and second organic silver salts, the first organic silver salt comprising a silver salt of a nitrogen-containing heterocyclic compound containing an imino group, and the second organic silver salt comprising a silver salt of a mercaptotriazole, and wherein at least part of the outer surface of the co-precipitate particle is covered by the second organic silver salt.

A black-and-white photothermographic material also comprises a support and having thereon at least one thermally developable imaging layer comprising a hydrophilic polymer binder or a water-dispersible polymer latex binder and in reactive association:

a. a photosensitive silver halide, b. a non-photosensitive source of reducible silver ions, and c. a reducing agent for the reducible silver ions, Wherein the non-photosensitive source of reducible silver ions predominantly comprises a co-precipitate particle comprising first and second organic silver salts, the first organic silver salt comprising a silver salt of a nitrogen-containing heterocyclic compound containing an imino group, and the second organic silver salt comprising a silver salt of a mercaptotriazole that is represented by the following Structure (I):

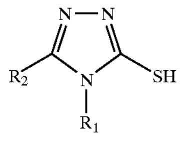

(I)

wherein $R_1$ is an alkyl or phenyl group and $R_2$ is hydrogen, provided that when $R_1$ is an unsubstituted phenyl group, $R_2$ is not hydrogen.

This invention also provides a method of forming a visible image comprising:

A) imagewise exposing a photothermographic material of this invention to form a latent image, B) simultaneously or sequentially, heating the exposed photothermographic material to develop the latent image into a visible image.

An imaging assembly of this invention comprises a photothermographic material of this invention that is arranged in association with one or more phosphor intensifying screens.

Still again, this invention provides a dispersion of a hydrophilic polymer binder or a water-dispersible polymer latex binder and co-precipitate particles comprising first and second organic silver salts, the first organic silver salt comprising a silver salt of a nitrogen-containing heterocyclic compound containing an imino group, and the second organic silver salt comprising a silver salt of a mercaptotriazole, and the hydrophilic polymer binder or the water-dispersible polymer latex binder being present in the dispersion in an amount of from about 2 to about 10 weight %, wherein the mercaptotriazole is represented by Structure (I) noted above.

We have found that certain organic silver salts (such as silver benzotriazoles) and silver salts of toners (such as silver salts of certain mercaptotriazoles) can be made and co-precipitated as a mixture of two organic silver salts in the same particles. The resulting mixed silver salts are stable amorphous particles or crystals. Although not wishing to be bound by theory, we believe that upon thermal development, the silver mercaptotriazole decomposes, releasing the mercaptotriazole toner to help form a dense black silver image, and also to accelerate thermal development. Non-released mercaptotriazole remains immobilized as its silver salt in the co-precipitate particles and cannot contribute either to black spots or increased Dmin upon storage. Natural Age Keeping and Archival Stability are improved while photospeed and other sensitometric properties in the thermally developable imaging materials are not affected.

DETAILED DESCRIPTION OF THE INVENTION

The thermally developable materials can be used in black-and-white photothermography and in electronically generated black-and-white hardcopy recording. They can be used in microfilm applications, in radiographic imaging (for example digital medical imaging), X-ray radiography, and in industrial radiography. Furthermore, in some embodiments, the absorbance of these materials between 350 and 450 nm is desirably low (less than 0.5), to permit their use in the graphic arts area (for example, imagesetting and phototypesetting), in the manufacture of printing plates, in contact printing, in duplicating ("duping"), and in proofing.

The photothermographic materials are particularly useful for medical imaging of human or animal subjects in response to visible or X-radiation for use in medical diagnosis. Such applications include, but are not limited to, thoracic imaging, mammography, dental imaging, orthopedic imaging, general medical radiography, therapeutic radiography, veterinary radiography, and autoradiography. When used with X-radiation, the photothermographic materials may be used in association with one or more phosphor intensifying screens, with phosphors incorporated within the photothermographic emulsion, or with a combination thereof.

The photothermographic materials can be made sensitive to radiation of any suitable wavelength. Thus, in some embodiments, the materials are sensitive at ultraviolet, visible, near infrared, or infrared wavelengths, of the electromagnetic spectrum. In these embodiments, the materials are preferably sensitive to radiation greater than 300 nm (such as sensitivity to, from about 300 nm to about 750 nm, preferably from about 300 to about 600 nm, and more preferably from about 300 to about 450 nm). In other embodiments they are sensitive to X-radiation. Increased sensitivity to X-radiation can be imparted through the use of phosphors.

The photothermographic materials are also useful for non-medical uses of visible or X-radiation (such as X-ray lithography and industrial radiography). In these and other imaging applications, it is particularly desirable that the photothermographic materials be "double-sided."

In some embodiments of the thermally developable materials, the components needed for imaging can be in one or more imaging or emulsion layers on one side ("frontside") of the support. The layer(s) that contain the photosensitive photocatalyst (such as a photosensitive silver halide) for photothermographic materials or the co-precipitate containing the non-photosensitive source of reducible silver ions, or both, are referred to herein as the emulsion layer(s). In photothermographic materials, the photocatalyst and non-photosensitive source of reducible silver ions are in catalytic proximity and preferably are in the same emulsion layer.

Where the thermally developable materials contain imaging layers on one side of the support only, various non-imaging layers can also be disposed on the "backside" (non-emulsion or non-imaging side) of the materials, including, conductive layers, antihalation layer(s), protective layers, antistatic layers, and transport enabling layers.

In such instances, Various non-imaging layers can also be disposed on the "frontside" or imaging or emulsion side of the support, including protective topcoat layers, primer layers, interlayers, opacifying layers, antistatic layers, antihalation layers, acutance layers, auxiliary layers, and other layers readily apparent to one skilled in the art.

For preferred embodiments, the thermally developable materials are "double-sided" or "duplitized" and have the same or different emulsion coatings (or thermally developable imaging layers) on both sides of the support. Such constructions can also include one or more protective topcoat layers, primer layers, interlayers, antistatic layers, acutance layers, antihalation layers, auxiliary layers, conductive layers, and other layers readily apparent to one skilled in the art on either or both sides of support. Preferably, such thermally developable materials have essentially the same layers on each side of the support.

When the thermally developable materials are heat-developed as described below in a substantially water-free condition after, or simultaneously with, imagewise exposure, a silver image (preferably a black-and-white silver image) is obtained.

Definitions

As used herein:

In the descriptions of the thermally developable materials, "a" or "an" component refers to "at least one" of that component (for example, the first and second organic silver salts).

The "co-precipitate" particles of this invention can also be referred to as "crystals", wherein each particle or crystal comprises a mixture of silver salts as described herein.

Unless otherwise indicated, the terms "thermally developable materials," "thermographic materials," "photothermographic materials," and "imaging assemblies" are used herein in reference to embodiments of the present invention:

Heating in a substantially water-free condition as used herein, means heating at a temperature of from about 50° C. to about 250° C. with little more than ambient water vapor present. The term "substantially water-free condition" means that the reaction system is approximately in equilibrium with water in the air and water for inducing or promoting the reaction is not particularly or positively supplied from the exterior to the material. Such a condition is described in T. H. James, *The Theory of the Photographic Process*, Fourth Edition, Eastman Kodak Company, Rochester, N.Y., 1977, p. 374.

"Photothermographic material(s)" means a construction comprising at least one photothermographic emulsion layer or a photothermographic set of emulsion layers (wherein the photosensitive silver halide and the source of reducible silver ions, that is the co-precipitate, are in one layer and the other essential components or desirable additives are distributed, as desired, in the same layer or in an adjacent coated layer). These materials also include multilayer constructions in which one or more imaging components are in different layers, but are in "reactive association." For example, one layer can include the non-photosensitive source of reducible silver ions and another layer can include the reducing agent and/or photosensitive silver halide.

"Thermographic material(s)" can be similarly constructed but are intentionally non-photosensitive (thus no photosensitive silver halide is intentionally added).

When used in photothermography, the term, "imagewise exposing" or "imagewise exposure" means that the material is imaged using any exposure means that provides a latent image using electromagnetic radiation. This includes, for example, by analog exposure where an image is formed by projection onto the photosensitive material as well as by digital exposure where the image is formed one pixel at a time such as by modulation of scanning laser radiation.

When used in thermography, the term, "imagewise exposing" or "imagewise exposure" means that the material is imaged using any means that provides an image using heat. This includes, for example, analog exposure where an image is formed by differential contact heating through a mask using a thermal blanket or infrared heat source, as well as by digital exposure where the image is formed one pixel at a time such as by modulation of a thin film thermal printhead or by heating with a modulated scanning laser beam.

The thermographic materials are "direct" thermographic materials and thermal imaging is carried out in a single thermographic material containing all of the necessary imaging chemistry. Direct thermal imaging is distinguishable from what is known in the art as thermal transfer imaging (such as dye transfer imaging) in which the image is produced in one material ("donor") and transferred to another material ("receiver") using thermal means.

"Catalytic proximity" or "reactive association" means that the materials are in the same layer or in adjacent layers so that they readily come into contact with each other during thermal imaging and development.

"Emulsion layer," "imaging layer," or "photothermographic (or thermographic) emulsion layer," means a layer of a photothermographic (or thermographic) material that contains the photosensitive silver halide (not present in thermographic materials) and/or non-photosensitive source of reducible silver ions (contained in the co-precipitate). It can also mean a layer of the material that contains, in addition to the photosensitive silver halide and/or non-photosensitive source of reducible ions, additional essential components and/or desirable additives such as the reducing agent(s). These layers are usually on what is known as the "frontside" of the support but they can be on both sides of the support.

In addition, "frontside" also generally means the side of a thermally developable material that is first exposed to imaging radiation, and "backside" generally refers to the opposite side of the thermally developable material.

"Photocatalyst" means a photosensitive compound such as silver halide that, upon exposure to radiation, provides a compound that is capable of acting as a catalyst for the subsequent development of the thermally developable material.

Many of the materials used herein are provided as a solution. The term "active ingredient" means the amount or the percentage of the desired material contained in a sample. All amounts listed herein are the amount of active ingredient added.

"Ultraviolet region of the spectrum" refers to that region of the spectrum less than or equal to 410 nm, and preferably from about 100 nm to about 410 nm, although parts of these ranges may be visible to the naked human eye. More preferably, the ultraviolet region of the spectrum is the region of from about 190 nm to about 405 nm.

"Visible region of the spectrum" refers to that region of the spectrum of from about 400 nm to about 700 nm.

"Short wavelength visible region of the spectrum" refers to that region of the spectrum of from about 400 nm to about 450 nm.

"Blue region of the spectrum" refers to that region of the spectrum of from about 400 nm to about 500 nm.

"Green region of the spectrum" refers to that region of the spectrum of from about 500 nm to about 600 nm.

"Red region of the spectrum" refers to that region of the spectrum of from about 600 nm to about 700 nm.

"Infrared region of the spectrum" refers to that region of the spectrum of from about 700 nm to about 1400 nm.

"Non-photosensitive" means not intentionally light sensitive.

"Transparent" means capable of transmitting visible light or imaging radiation without appreciable scattering or absorption.

The sensitometric terms "photospeed," "speed," or "photographic speed" (also known as sensitivity), absorbance, contrast, Dmin, and Dmax have conventional definitions known in the imaging arts. In photothermographic materials, Dmin is considered herein as image density achieved when the photothermographic material is thermally developed without prior exposure to radiation. It is the average of eight lowest density values on the exposed side of the fiducial mark. In thermographic materials, Dmin is considered herein as the image density in the areas with the minimum application of heat by the thermal printhead.

In photothermographic materials, the term Dmax is the maximum image density achieved when the photothermographic material is exposed to a particular radiation source and a given amount of radiation energy and then thermally developed. In thermographic materials, the term Dmax is the maximum image density achieved when the thermographic material is thermally imaged with a given amount of thermal energy.

The terms "density," "optical density (OD)," and "image density" refer to the sensitometric term absorbance.

"Spd-1" (Speed-1) is Log1/E+4 corresponding to the density value of 0.25 above Dmin where E is the exposure in $ergs/cm^2$.

"Spd-2" (Speed-2) is Log1/E+4 corresponding to the density value of 1.0 above Dmin where E is the exposure in $ergs/cm^2$.

Average Contrast-1 ("AC-1") is the absolute value of the slope of the line joining the density points of 0.60 and 2.00 above Dmin.

"Archival Stability" or "Dark stability" is the stability of the imaged film when stored for a period of time under temperature and relative humidity conditions defined in the Examples.

"Aspect ratio" refers to the ratio of particle or grain "ECD" to particle or grain thickness wherein ECD (equivalent circular diameter) refers to the diameter of a circle having the same projected area as the particle or grain.

"Width index" is a measure of particle size distribution within a defined range [See, T. Allen, *Particle Size Measurement, Vol I*, Chapman & Hall, London, UK, 1997, p. 54]. As used herein, the width index is determined from the $14^{th}$, $50^{th}$, and $86^{th}$ percentile of the cumulative frequency distribution for the characteristic particle dimension under consideration, defined by the following formula:

$$\frac{[(50\ \text{percentile}/14\ \text{percentile}) + (86\ \text{percentile}/50\ \text{percentile})]}{2}$$

Using this formula, a dispersion of completely monodisperse particles would have a width index of one.

The phrase "organic silver coordinating ligand" refers to an organic molecule capable of forming a bond with a silver atom. Although the compounds so formed are technically silver coordination complexes or silver compounds they are also often referred to as silver salts.

In the compounds described herein, no particular double bond geometry (for example, cis or trans) is intended by the structures drawn unless otherwise specified. Similarly, in compounds having alternating single and double bonds and localized charges their structures are drawn as a formalism. In reality, both electron and charge delocalization exists throughout the conjugated chain.

As is well understood in this art, for the chemical compounds herein described, substitution is not only tolerated, but is often advisable and various substituents are anticipated on the compounds used in the present invention unless otherwise stated. Thus, when a compound is referred to as "having the structure" of, or as "a derivative" of, a given formula, any substitution that does not alter the bond structure of the formula or the shown atoms within that structure is included within the formula, unless such substitution is specifically excluded by language.

As a means of simplifying the discussion and recitation of certain substituent groups, the term "group" refers to chemical species that may be substituted as well as those that are not so substituted. Thus, the term "alkyl group" is intended to include not only pure hydrocarbon alkyl chains, such as methyl, ethyl, n-propyl, t-butyl, cyclohexyl, iso-octyl, and octadecyl, but also alkyl chains bearing substituents known in the art, such as hydroxyl, alkoxy, phenyl, halogen atoms (F, Cl, Br, and I), cyano, nitro, amino, and carboxy. For example, alkyl group includes ether and thioether groups (for example $CH_3—CH_2—CH_2—O—CH_2—$ and $CH_3—CH_2—CH_2—S—CH_2—$), hydroxyalkyl (such as 1,2-dihydroxyethyl), haloalkyl, nitroalkyl, alkylcarboxy, carboxyalkyl, carboxamido, sulfoalkyl, and other groups readily apparent to one skilled in the art. Substituents that adversely react with other active ingredients, such as very strongly electrophilic or oxidizing substituents, would, of course, be excluded by the ordinarily skilled artisan as not being inert or harmless.

*Research Disclosure* is a publication of Kenneth Mason Publications Ltd., Dudley House, 12 North Street, Emsworth, Hampshire PO10 7DQ England (also available from Emsworth Design Inc., 147 West 24th Street, New York, N.Y. 10011).

Other aspects, advantages, and benefits of the present invention are apparent from the detailed description, examples, and claims provided in this application.

The Photocatalyst

The photothermographic materials include one or more photocatalysts in the photothermographic emulsion layer(s). Useful photocatalysts are typically photosensitive silver halides such as silver bromide, silver iodide, silver chloride, silver bromoiodide, silver chlordbromoiodide, silver chlorobromide, and others readily apparent to one skilled in the art. Mixtures of silver halides can also be used in any suitable proportion. Silver bromide and silver bromoiodide are more preferred silver halides, with the latter silver halide having up to 10 mol % silver iodide based on total silver halide.

In some embodiments, higher amounts of iodide may be present in the photosensitive silver halide grains up to the saturation limit of iodide as described in U.S. Patent Application Publication 2004/0053173 (Maskasky et al.).

The shape (morphology) of the photosensitive silver halide grains used in the present need not be limited. The silver halide grains may have any crystalline habit including cubic, octahedral, tetrahedral, orthorhombic, rhombic, dodecahedral, other polyhedral, tabular, laminar, twinned, or platelet morphologies and may have epitaxial growth of crystals thereon. If desired, a mixture of these crystals can be employed. Silver halide grains having cubic and tabular morphology (or both) are preferred. More preferably, the silver halide grains are predominantly (at least 50% based on total silver halide) present as tabular grains.

The silver halide grains may have a uniform ratio of halide throughout. They may have a graded halide content, with a continuously varying ratio of, for example, silver bromide and silver iodide or they may be of the core-shell type, having a discrete core of one or more silver halides, and a discrete shell of one of more different silver halides. Core-shell silver halide grains useful in photothermographic materials and methods of preparing these materials are described for example in U.S. Pat. No. 5,382,504 (Shor et al.), incorporated herein by reference. Iridium and/or copper doped core-shell and non-core-shell grains are described in U.S. Pat. No. 5,434,043 (Zou et al.) and U.S. Pat. No. 5,939,249 (Zou), both incorporated herein by reference.

In some instances, it may be helpful to prepare the photosensitive silver halide grains in the presence of a hydroxytetraazaindene or an N-heterocyclic compound comprising at least one mercapto group as described in U.S. Pat. No. 6,413,710 (Shor et al.), that is incorporated herein by reference.

The photosensitive silver halide can be added to (or formed within) the emulsion layer(s) in any fashion as long as it is placed in catalytic proximity to the non-photosensitive source of reducible silver ions in the co-precipitate.

It is preferred that the silver halide grains be preformed and prepared by an ex-situ process, chemically and spectrally sensitized, and then be added to and physically mixed with the non-photosensitive source of reducible silver ions.

It is also possible to form the source of reducible silver ions in the presence of ex-situ-prepared silver halide grains. In this process, the co-precipitated source of reducible silver ions is formed in the presence of the preformed silver halide grains. Co-precipitation of the reducible source of silver ions in the presence of silver halide provides a more intimate mixture of the two materials [see, for example U.S. Pat. No. 3,839,049 (Simons)] to provide a "preformed emulsion." This method is useful when non-tabular silver halide grains are used.

In general, the non-tabular silver halide grains used in this invention can vary in average diameter of up to several micrometers ($\mu$m) and they usually have an average particle size of from about 0.01 to about 1.5 $\mu$M (preferably from about 0.03 to about 1.0 $\mu$m, and more preferably from about 0.05 to about 0.8 $\mu$m). The average size of the photosensitive silver halide grains is expressed by the average diameter if the grains are spherical, and by the average of the diameters of equivalent circles for the projected images if the grains are cubic, tabular, or other non-spherical shapes. Representative grain sizing methods are described by in Particle Size Analysis, ASTM Symposium on Light Microscopy, R. P.

Loveland, 1955, pp. 94–122, and in C. E. K. Mees and T. H. James, *The Theory of the Photographic Process*, Third Edition, Macmillan, New York, 1966, Chapter 2.

In most preferred embodiments of this invention, the silver halide grains are provided predominantly (based on at least 50 mol % silver) as tabular silver halide grains that are considered "ultrathin" and have an average thickness of at least 0.02 $\mu$m and up to and including 0.10 $\mu$m (preferably an average thickness of at least 0.03 $\mu$m and more preferably of at least 0.04 $\mu$m, and up to and including 0.08 $\mu$m and more preferably up to and including 0.07 $\mu$m).

In addition, these ultrathin tabular grains have an equivalent circular diameter (ECD) of at least 0.5 $\mu$m (preferably at least 0.75 am, and more preferably at least 1 $\mu$m). The ECD can be up to and including 8 $\mu$m (preferably up to and including 6 $\mu$m, and more preferably up to and including 4 $\mu$m).

The aspect ratio of the useful tabular grains is at least 5:1 (preferably at least 10:1, and more preferably at least 15:1) and generally up to 50:1. The grain size of ultrathin tabular grains may be determined by any of the methods commonly employed in the art for particle size measurement, such as those described above. Ultrathin tabular grains and their method of preparation and use in photothermographic materials are described in U.S. Pat. No. 6,576,410 (Zou et al.) and U.S. Pat. No. 6,673,529 (Daubendiek et al.) that are incorporated herein by reference.

The ultrathin tabular silver halide grains can also be doped using one or more of the conventional metal dopants known for this purpose including those described in *Research Disclosure* item 38957, September, 1996 and U.S. Pat. No. 5,503,970 (Olm et al.), incorporated herein by reference. Preferred dopants include iridium (III or IV) and ruthenium (II or III) salts. Particularly preferred silver halide grains are ultrathin tabular grains containing iridium-doped azole ligands. Such tabular grains and their method of preparation are described in copending and commonly assigned U.S. Ser. No. 10/826,708 (filed on Apr. 16, 2004 by Olm et al.) that is incorporated herein by reference.

It is also possible to form some in-situ silver halide, by a process in which an inorganic halide- or an organic halogen-containing compound is added to an organic silver salt to partially convert the silver of the organic silver salt to silver halide as described in U.S. Pat. No. 3,457,075 (Morgan et al.).

The one or more light-sensitive silver halides used in the photothermographic materials are preferably present in an amount of from about 0.005 to about 0.5 mole (more preferably from about 0.01 to about 0.25 mole, and most preferably from about 0.03 to about 0.15 mole) per mole of non-photosensitive source of reducible silver ions.

Chemical Sensitizers

If desired, the photosensitive silver halides used in the photothermographic materials can be chemically sensitized using any useful compound that contains sulfur, tellurium, or selenium, or may comprise a compound containing gold, platinum, palladium, ruthenium, rhodium, iridium, or combinations thereof, a reducing agent such as a tin halide or a combination of any of these. The details of these materials are provided for example, in T. H. James, *The Theory of the Photographic Process*, Fourth Edition, Eastman Kodak Company, Rochester, N.Y., 1977, Chapter 5, pp. 149–169. Suitable conventional chemical sensitization procedures and compounds are also described in U.S. Pat. No. 1,623,499 (Sheppard et al.), U.S. Pat. No. 2,399,083 (Waller et al.), U.S. Pat. No. 3,297,447 (McVeigh), U.S. Pat. No. 3,297,446 (Dunn), U.S. Pat. No. 5,049,485 (Deaton), U.S. Pat. No. 5,252,455 (Deaton), U.S. Pat. No. 5,391,727 (Deaton), U.S. Pat. No. 5,912,111 (Lok et al.), U.S. Pat. No. 5,759,761 (Lushington et al.), U.S. Pat. No. 6,296,998 (Eikenberry et al), and U.S. Pat. No. 5,691,127 (Daubendiek et al.), and EP 0 915 371 A1 (Lok et al.), all incorporated herein by reference.

Certain substituted or and unsubstituted thioureas can be used as chemical sensitizers including those described in U.S. Pat. No. 6,296,998 (Eikenberry et al.), U.S. Pat. No. 6,322,961 (Lam et al.), U.S. Pat. No. 4,810,626 (Burgmaier et al.), and U.S. Pat. No. 6,368,779 (Lynch et al.), all of the which are incorporated herein by reference.

Still other useful chemical sensitizers include tellurium- and selenium-containing compounds that are described in and U.S. Pat. No. 5,158,892 (Sasaki et al.), U.S. Pat. No. 5,238,807 (Sasaki et al.), U.S. Pat. No. 5,942,384 (Arai et al.) U.S. Pat. No. 6,620,577 (Lynch et al.), and U.S. Pat. No. 6,699,647 (Lynch et al.), all of which are incorporated herein by reference.

Noble metal sensitizers for use in the present invention include gold, platinum, palladium and iridium. Gold (I or III) sensitization is particularly preferred, and described in U.S. Pat. No. 5,858,637 (Eshelman et al.) and U.S. Pat. No. 5,759,761 (Lushington et al.). Combinations of gold(III) compounds and either sulfur- or tellurium-containing compounds are useful as chemical sensitizers and are described in U.S. Pat. No. 6,423,481 (Simpson et al.). All of the above references are incorporated herein by reference.

In addition, sulfur-containing compounds can be decomposed on silver halide grains in an oxidizing environment according to the teaching in U.S. Pat. No. 5,891,615 (Winslow et al.). Examples of sulfur-containing compounds that can be used in this fashion include sulfur-containing spectral sensitizing dyes.

Other useful sulfur-containing chemical sensitizing compounds that can be decomposed in an oxidized environment are the diphenylphosphine sulfide compounds described in copending and commonly assigned U.S. Ser. No. 10/731,251 (filed Dec. 9, 2003 by Simpson, Burleva, and Sakizadeh), incorporated herein by reference.

The chemical sensitizers can be used in making the silver halide emulsions in conventional amounts that generally depend upon the average size of silver halide grains. Generally, the total amount is at least $10^{-10}$ mole per mole of total silver, and preferably from about $10^{-8}$ to about $10^{-2}$ mole per mole of total silver. The upper limit can vary depending upon the compound(s) used, the level of silver halide, and the average grain size and grain morphology.

Spectral Sensitizers

The photosensitive silver halides used in the photothermographic materials may be spectrally sensitized with one or more spectral sensitizing dyes that are known to enhance silver halide sensitivity to ultraviolet, visible, and/or infrared radiation of interest. Non-limiting examples of sensitizing dyes that can be employed include cyanine dyes, merocyanine dyes, complex cyanine dyes, complex merocyanine dyes, holopolar cyanine dyes, hemicyanine dyes, styryl dyes, and hemioxanol dyes. They may be added at any stage in chemical finishing of the photothermographic emulsion, but are generally added after chemical sensitization. It is particularly useful that the photosensitive silver halides be spectrally sensitized to a wavelength of from about 300 to about 750 nm, preferably from about 300 to about 600 nm, more preferably to a wavelength of from about 300 to about 450 nm, even more preferably from a wavelength of from about 360 to 420 nm, and most preferably from a wavelength of from about 380 to about 420 nm. A worker skilled in the art would know which dyes would provide the desired spectral sensitivity.

Suitable sensitizing dyes such as those described in U.S. Pat. No. 3,719,495 (Lea), U.S. Pat. No. 4,396,712 (Kinoshita et al.), U.S. Pat. No. 4,439,520 (Kofron et al.), U.S. Pat. No. 4,690,883 (Kubodera et al.), U.S. Pat. No. 4,840,882 (Iwagaki et al.), U.S. Pat. No. 5,064,753 (Kohno et al.), U.S. Pat. No. 5,281,515 (Delprato et al.), U.S. Pat. No. 5,393,654 (Burrows et al), U.S. Pat. No. 5,441,866 (Miller et al.), U.S. Pat. No. 5,508,162 (Dankosh), U.S. Pat. No. 5,510,236 (Dankosh), and U.S. Pat. No. 5,541,054 (Miller et al.), and Japanese Kokai 2000-063690 (Tanaka et al.), 2000-112054 (Fukusaka et al.), 2000-273329 (Tanaka et al.), 2001-005145 (Arai), 2001-064527 (Oshiyama et al.), and 2001-154305 (Kita et al.), and *Research Disclosure*, item 308119, Section IV, December, 1989. All of these publications are incorporated herein by reference.

Teachings relating to specific combinations of spectral sensitizing dyes also provided in U.S. Pat. No. 4,581,329 (Sugimoto et al.), U.S. Pat. No. 4,582,786 (Ikeda et al.), U.S. Pat. No. 4,609,621 (Sugimoto et al.), U.S. Pat. No. 4,675,279 (Shuto et al.), U.S. Pat. No. 4,678,741 (Yamada et al.), U.S. Pat. No. 4,720,451 (Shuto et al.), U.S. Pat. No. 4,818,675 (Miyasaka et al.), U.S. Pat. No. 4,945,036 (Arai et al.), and U.S. Pat. No. 4,952,491 (Nishikawa et al.), all of which are incorporated herein by reference.

Also useful are spectral sensitizing dyes that decolorize by the action of light or heat as described in U.S. Pat. No. 4,524,128 (Edwards et al.), and Japanese Kokai 2001-109101 (Adachi), 2001-154305 (Kita et al.), and 2001-183770 (Hanyu et al.), all of which are incorporated herein by reference.

Dyes may be selected for the purpose of supersensitization to attain much higher sensitivity than the sum of sensitivities that can be achieved by using each dye alone.

An appropriate amount of spectral sensitizing dye added is generally about $10^{-10}$ to $10^{-1}$ mole, and preferably, from about $10^{-7}$ to $10^{-2}$ mole per mole of silver halide.

Non-Photosensitive Source of Reducible Silver Ions

The non-photosensitive source of reducible silver ions used in the thermally developable materials includes one or more organic silver salts of nitrogen-containing heterocyclic compounds containing an imino group. Such silver(I) salts are comparatively stable to light and form a silver image when heated to 50° C. or higher in the presence of an exposed silver halide (for photothermographic materials) and a reducing agent. These salts are also used in thermographic materials where they directly participate in thermal image formation.

Representative organic silver salts include, but are not limited to, silver salts of benzotriazole and substituted derivatives thereof (for example, silver methylbenzotriazole and silver 5-chlorobenzotriazole), silver salts of nitrogen acids selected from the group consisting of imidazole, pyrazole, urazole, 1,2,4-triazole and 1H-tetrazole nitrogen acids or combinations thereof, as described in U.S. Pat. No. 4,220,709 (deMauriac). Also included are the silver salts of imidazole and imidazole derivatives as described in U.S. Pat. No. 4,260,677 (Winslow et al.). Both of these patents are incorporated herein by reference. A nitrogen acid as described herein is intended to include those compounds which have the moiety —NH— in the heterocyclic nucleus.

Particularly useful silver salts are the silver salts of benzotriazole, substituted derivatives thereof, or mixtures of two or more of these salts. A silver salt of benzotriazole is most preferred.

While the noted organic silver salts are the predominant silver salts in the materials, secondary organic silver salts can be used if present in "minor" amounts (less than 40 mol % based on the total moles of organic silver salts). However, these secondary organic silver salts are not generally part of the co-precipitate.

Such secondary organic silver salts include silver salts of heterocyclic compounds containing mercapto or thione groups and derivatives thereof such as silver triazoles, oxazoles, thiazoles, thiazolines, imidazoles, diazoles, pyridines, and triazines as described in U.S. Pat. No. 4,123,274 (Knight et al.) and U.S. Pat. No. 3,785,830 (Sullivan et al.). Examples of other useful silver salts of mercapto or thione substituted compounds that do not contain a heterocyclic nucleus include silver salts of thioglycolic acids, dithiocarboxylic acids, and thioamides. Silver salts of organic acids including silver salts of long-chain aliphatic or aromatic carboxylic acids may also be included as secondary silver salts.

Secondary organic silver salts can also be core-shell silver salts as described in U.S. Pat. No. 6,355,408 (Whitcomb et al.), that is incorporated herein by reference wherein a core has one or more silver salts and a shell has one or more different silver salts. Other secondary organic silver salts can be silver dimer compounds that comprise two different silver salts as described in U.S. Pat. No. 6,566,045 (Whitcomb) that is incorporated herein by reference.

Still other useful secondary silver salts are the silver core-shell compounds comprising a primary core comprising one or more photosensitive silver halides, or one or more non-photosensitive inorganic metal salts or non-silver containing organic salts, and a shell at least partially covering the primary core, wherein the shell comprises one or more non-photosensitive silver salts, each of which silver salts comprises a organic silver coordinating ligand. Such compounds are described in U.S. Patent Application Publication 2004/0023164 (Bokhonov et al.) that is incorporated herein by reference.

The one or more non-photosensitive sources of reducible silver ions (both primary and secondary organic silver salts) are preferably present in a total amount of about 5% by weight to about 70% by weight, and more preferably, about 10% to about 50% by weight, based on the total dry weight of the emulsion layers. Alternatively, the total amount of reducible silver ions is generally present in an amount of from about 0.001 to about 0.2 mol/$m^2$ of the dry thermally developable material (preferably from about 0.01 to about 0.05 mol/$m^2$).

The total amount of silver (from all silver sources) in the photothermographic materials is generally at least 0.002 mol/$m^2$ and preferably from about 0.01 to about 0.05 mol/$m^2$ for single-sided materials. For double-sided coated materials, total amount of silver from all sources would be doubled. The amount of silver in the thermographic materials is generally from about 0.01 to about 0.05 mol/$m^2$.

The Silver Salt of Mercaptotriazole Toners

Toners are compounds that when added to the photothermographic imaging layer(s) shift the color of the developed silver image from yellowish-orange to brown-black or blue-black. Many toners also increase the rate of development of the silver image. Compounds useful in this invention are silver salts of mercaptotriazole toner compounds. Thus, the second organic silver salts useful in the present invention include one or more silver salts of mercaptotriazoles. Numerous mercaptotriazoles are described in U.S. Pat. No. 3,832,186 (Masuda et al.), U.S. Pat. No. 4,451,561 (Hirabayshi et al.), U.S. Pat. No. 5,149,620 (Simpson et al.), and U.S. Pat. No. 6,713,240 (Lynch et al.), all incorporated herein by reference.

In preferred embodiments, the useful mercaptotriazoles can be represented by the following Structure (I):

(I)

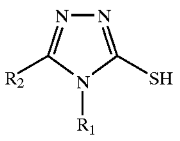

wherein $R_1$ and $R_2$ independently represent hydrogen, a substituted or unsubstituted alkyl group of from 1 to 7 carbon atoms (such as methyl, ethyl, isopropyl, t-butyl, n-hexyl, hydroxymethyl, and benzyl), a substituted or unsubstituted alkenyl group having 2 to 5 carbon atoms in the hydrocarbon chain (such as ethenyl, 1,2-propenyl, methallyl, and 3-buten-1-yl), a substituted or unsubstituted cycloalkyl group having 5 to 7 carbon atoms forming the ring (such as cyclopenyl, cyclohexyl, and 2,3-dimethylcyclohexyl), a substituted or unsubstituted aromatic or non-aromatic heterocyclyl group having 5 or 6 carbon, nitrogen, oxygen, or sulfur atoms forming the aromatic or non-aromatic heterocyclyl group (such as pyridyl, furanyl, thiazolyl, and thienyl), an amino or amide group (such as amino or acetamido), and a substituted or unsubstituted aryl group having 6 to 10 carbon atoms forming the aromatic ring (such as phenyl, tolyl, naphthyl, and 4-ethoxyphenyl).

In addition, $R_1$ and $R_2$ can be a substituted or unsubstituted $Y_1$—$(CH_2)_k$— group wherein $Y_1$ is a substituted or unsubstituted aryl group having 6 to 10 carbon atoms as defined above for $R_1$ and $R_2$, or a substituted or unsubstituted aromatic or non-aromatic heterocyclyl group as defined above for $R_1$. Also, k is 1–3. In particular, $R_1$ and $R_2$ can represent a divalent linking group (such as a 1,4-phenylene, methylene, or ethylene group) that links two mercaptotriazole groups (that is $Y_1$ is another mercaptotriazole group).

Alternatively, $R_1$ and $R_2$ taken together can form a substituted or unsubstituted, saturated or unsaturated 5- to 7-membered aromatic or non-aromatic nitrogen-containing heterocyclic ring comprising carbon, nitrogen, oxygen, or sulfur atoms in the ring (such as pyridyl, diazinyl, triazinyl, piperidine, morpholine, pyrrolidine, pyrazolidine, and thiomorpholine).

Additionally, $R_2$ may represent a carboxy group or its salts.

The definition of mercaptotriazoles of Structure (I) also includes the following provisos:

1) $R_1$ and $R_2$ are not simultaneously hydrogen, and

2) When $R_1$ is unsubstituted phenyl, $R_2$ is not hydrogen.

Preferably, $R_1$ is a substituted or unsubstituted alkyl group (such as methyl, t-butyl, and benzyl), or a substituted phenyl group (such as, o-, m-, and p-tolyl or o-, m-, and p-chloro). More preferably, $R_1$ is benzyl.

Preferably, $R_2$ is hydrogen, acetamido, or hydroxymethyl. More preferably, $R_2$ is hydrogen.

It is well known that heterocyclic compounds exist in tautomeric forms. Both annular (ring) tautomerism and substituent tautomerism are possible. In 1,2,4-mercaptotriazoles, at least three tautomers (a 1H form, a 2H form, and a 4H form) are possible. Thiol-thione substituent tautomerism is also possible. Interconversion among these tautomers can occur rapidly and individual tautomers are usually not isolatable, although one tautomeric form may predominate. For the 1,2,4-mercaptotriazoles of this invention, the 4H-thiol structural formalism is used with the understanding that other tautomers do exist.

The exact crystal structure of the co-precipitate of the first organic silver salt comprising a nitrogen-containing heterocyclic compound containing an imino group, and the second organic silver salt comprising a silver salt of a mercaptotriazole, is not known. However, we believe that the following Structure (II) is one fair representation of a silver salt of a mercaptotriazole molecule.

(II)

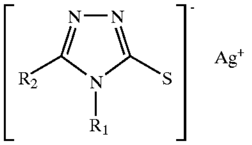

wherein $R_1$ and $R_2$ are as defined above.

Representative mercaptotriazoles useful in the practice of the present invention include the silver salts (that is, silver coordination complexes or silver compounds) of the following compounds T-1 through T-59:

(T-1)

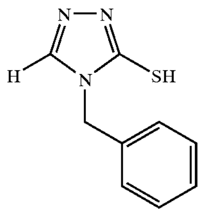

(T-2)

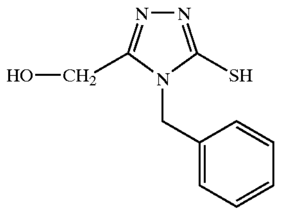

(T-3)

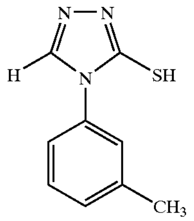

-continued
(T-4)
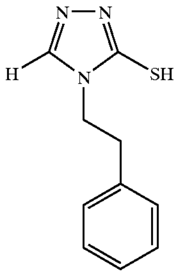
(T-5)
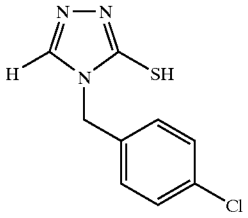
(T-6)
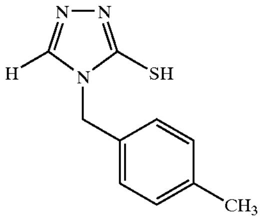
(T-7)
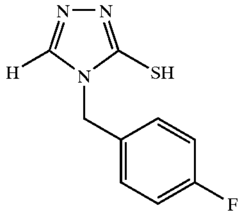
(T-8)
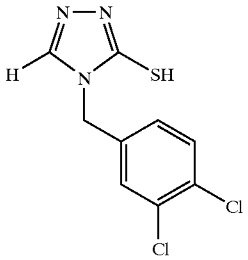
(T-9)
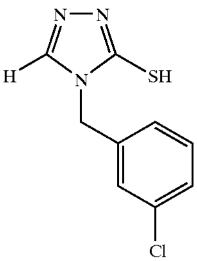
-continued
(T-10)
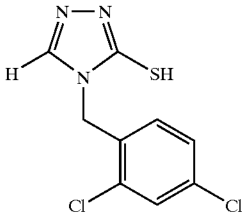
(T-11)
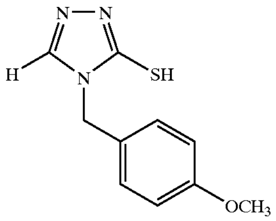
(T-12)
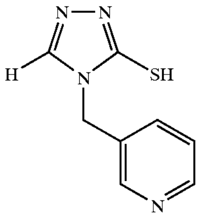
(T-13)
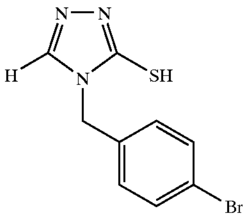
(T-14)
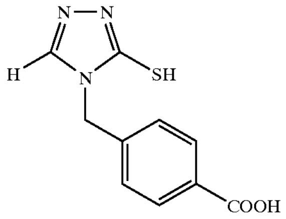
(T-15)
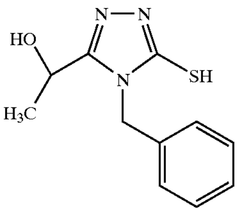

-continued
(T-16)
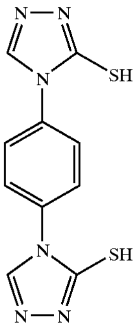
(T-17)
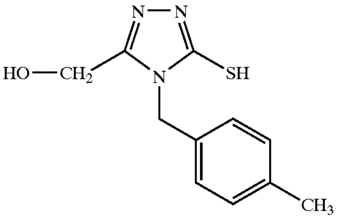
(T-18)
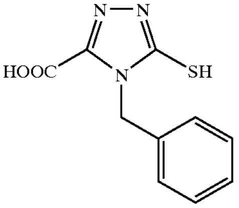
(T-19)
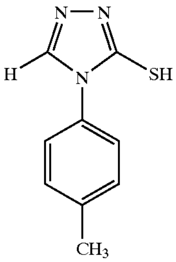
(T-20)
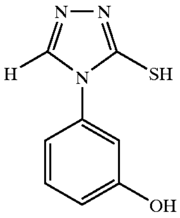
(T-21)
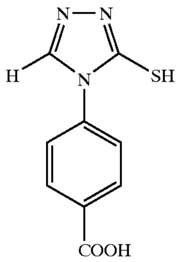
-continued
(T-22)
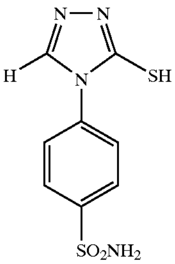
(T-23)
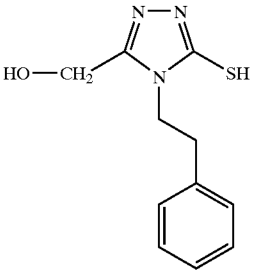
(T-24)
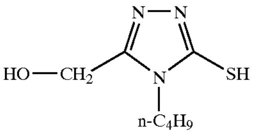
(T-25)
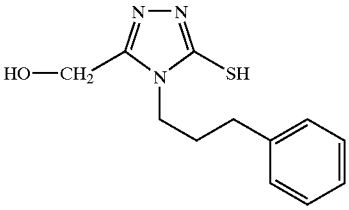
(T-26)
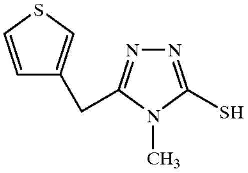
(T-27)
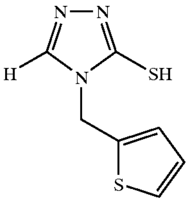
(T-28)
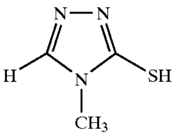
(T-29)
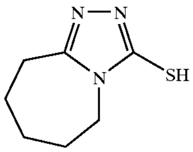

-continued
(T-30)
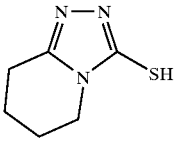
(T-31)
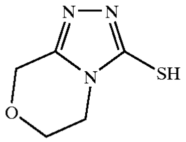
(T-32)
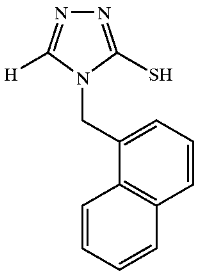
(T-33)
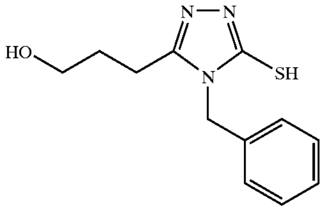
(T-34)
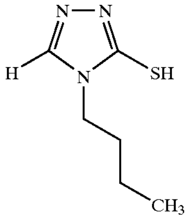
(T-35)
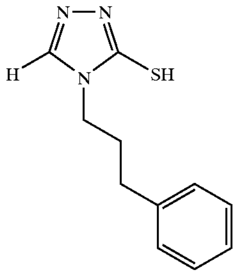
(T-36)
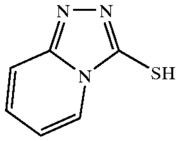
(T-37)
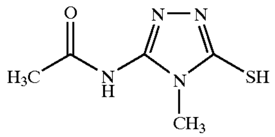
-continued
(T-38)
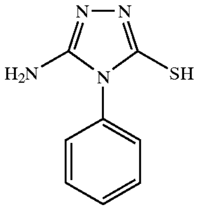
(T-39)
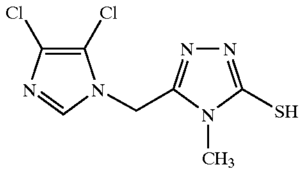
(T-40)
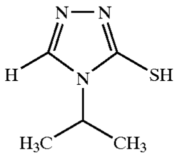
(T-41)
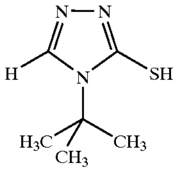
(T-42)
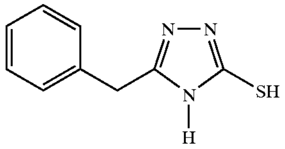
(T-43)
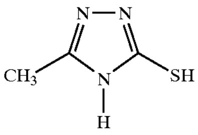
(T-44)
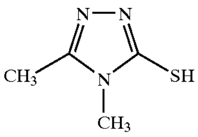
(T-45)
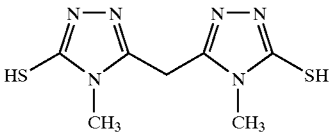
(T-46)
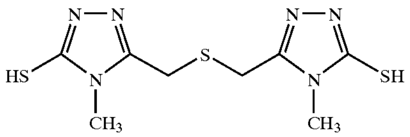

-continued
(T-47)
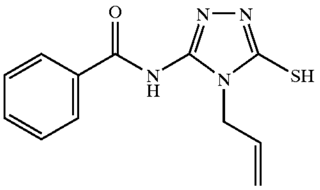
(T-48)
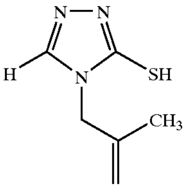
(T-49)
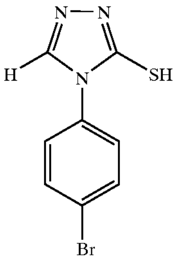
(T-50)
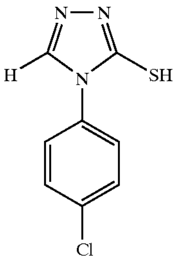
(T-51)
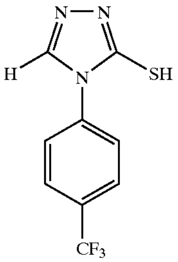
(T-52)
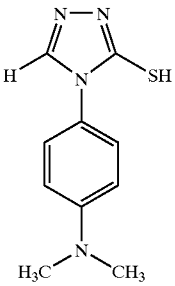
-continued
(T-53)
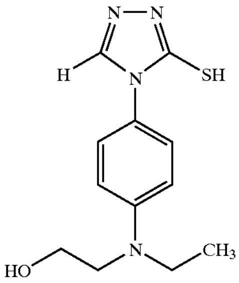
(T-54)
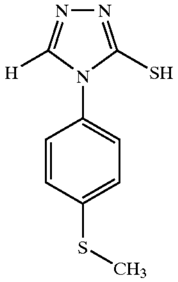
(T-55)
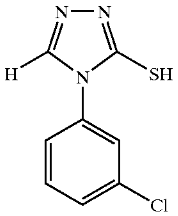
(T-56)
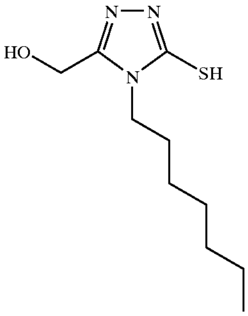
(T-57)
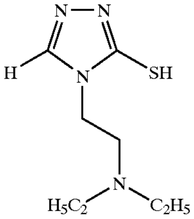
(T-58)
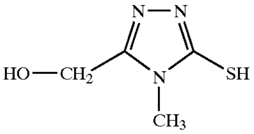

-continued (T-59)

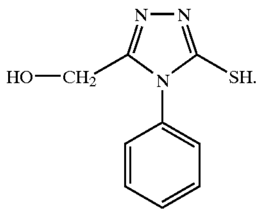

Compounds T-1, T-2, T-11, T-12, T-16, T-37, T-41, and T-44 are more preferred in the practice of this invention, and Compound T-1 is most preferred.

The mercaptotriazole compounds described herein can be readily prepared using known synthetic methods. For example, compound T-1 can be prepared as described in U.S. Pat. No. 4,628,059 (Finkelstein et al.). Additional preparations of various mercaptotriazoles are described in U.S. Pat. No. 3,769,411 (Greenfield et al.), U.S. Pat. No. 4,183,925 (Baxter et al.), and U.S. Pat. No. 6,074,813 (Asanuma et al.), DE 1 670 604 (Korosi), and in *Chem. Abstr.* 1968, 69, 52114j. Some mercaptotriazole compounds are commercially available.

Co-Precipitates

The non-photosensitive source of reducible silver ions and the mercaptotriazole toner compound are incorporated into the thermally developable materials as co-precipitated silver salts. Thus, the co-precipitate is a mixture of "first" and "second" organic silver salts in which the "first" organic silver salt comprises one or more silver salts of nitrogen-containing heterocyclic compounds containing an imino group (described above). The "second" organic silver salt comprises one or more silver salts of mercaptotriazoles (described above).

Preferably, the first organic silver salt is a silver salt of a benzotriazole (described above) and the second organic silver salt is a silver salt of a mercaptotriazole compound defined by Structure (I) identified above.

The co-precipitate particles can have various shapes. For example, they can be rod-shaped, cubic, tabular, or platelet in form. Preferably, they are rod-shaped and have an aspect ratio of at least 2, more preferably at least 3 and up to 20, and most preferably of from about 3 to about 10. The particles (any shape) generally have largest dimensions (length or diameter) ranging from about 0.2 to about 0.8 μm. The rod-shaped particles generally have a diameter of less than or equal to 0.1 μm and a length that is less than 1 μm. Preferably, the particles have a diameter of from about 0.03 to about 0.07 μm and a length of from about 0.1 to about 0.5 μm.

Where the co-precipitate particles are rod-shaped, the distribution of co-precipitate crystals is relatively uniform in size as defined by a width index for particle diameter of 1.25 or less, and preferably from about 1.1 to about 1.2.

The most preferred co-precipitate particles are composed of silver benzotriazole as the first organic silver salt and a silver salt of the mercaptotriazole identified as Compound T-1 above as the second organic silver salt. These particles have an aspect ratio of from about 4 to about 7.5, a width index for grain diameter of from about 1.1 to about 1.2, a length of from about 0.1 to about 0.3 μm, and a diameter of from about 0.04 to about 0.06 μm.

The distribution of the first and second organic silver salts throughout the co-precipitate may take many forms so long as at least some second organic silver salt is present within 25 volume % of the outer surface of the co-precipitate.

Thus, in some embodiments, the first and second organic silver salts are uniformly distributed throughout the co-precipitate particle volume. These particles are substantially homogenous in composition.

However, in other embodiments, there is a concentration gradient of the second organic silver salt throughout the co-precipitate particle. This concentration gradient can be continuous and increase steadily in concentration from the center of the particle to its outer surface. For example, the concentration gradient can be defined using "volume %" of the co-precipitate particle wherein 0 volume % represents the center of the particle and 100 volume % represents the outer surface. Instead of continuous concentration gradient, there can be discrete bands of specific concentrations of the second organic silver salt at specific volume regions of the particle, which bands are interrupted by bands of the first organic silver salt. The continuous gradients or discrete bands can be obtained by adding the mercaptotriazole to the reaction mixture at particular times using specific flow rates, as one skilled in the art would appreciate.

In preferred embodiments, there is more of the second organic silver salt closer to the outer surface than towards the center of the co-precipitate crystal. Thus, the second organic silver salt is distributed predominantly near the co-precipitate outer surface. For example, at least 95 mol % of the second organic silver salt can be present within a localized portion that is from about 75 to 100 volume % of the co-precipitate particle. Preferably, at least 95 mol % of the second organic silver salt can be present within a localized portion that is from about 90 to 100 volume % of the co-precipitate particle. More preferably, at least 95 mol % of the second organic silver salt can be present within a localized portion that is from about 95 to 100 volume % of the co-precipitate particle. Even more preferably, 100% of the second organic silver salt is present within the defined localized portions.

In still other preferred embodiments, the second organic silver salt is at least partially covering the surface of the co-precipitate, and more preferably, it completely covers the outer particle surface.

The molar ratio of the first organic silver salt to the second organic silver salt in the co-precipitate particle is generally from about 100:1 to about 15:1 and preferably from about 60:1 to about 25:1. As noted above, these molar ratios can be constant throughout the crystal (homogeneous), or vary within regions and it is particularly different at the outer surface compared to the particle center.

The co-precipitates of this invention are generally prepared using certain conditions and procedure that will provide particles with desired morphology and concentration gradients of the second organic silver salt, depending upon amounts and times of addition of various organic silver salts. Thus, the method of making the co-precipitate is carried out by first preparing an aqueous solution (solution A) of one or more suitable nitrogen-containing heterocyclic compounds containing an imino group. These heterocyclic compounds are generally present in solution A at a concentration of at least 0.1 mol/l, and preferably from about 2 to about 4 mol/l.

The one or more mercaptotriazoles are included within Solution A or in a separate Solution A' at a concentration of at least 0.1 mol/l, and preferably from about 0.5 to about 3 moles/liter. Solution A or A' can also contain one or more bases (such as hydroxides) to adjust the pH. Preferably, solutions A and A' are different so that upon addition the various organic silver salts are formed at different rates and in different regions of the co-precipitate particle.

An aqueous solution (Solution B) of one or more aqueous soluble inorganic silver salts (such as silver nitrate) is also prepared.

A suitable reaction vessel is used to make the primary silver salts. In this vessel is an aqueous solution of from about 2 to about 10 weight % of one or more hydrophilic polymer binders (see below) or water-dispersible hydrophobic polymer binders (in latex form). Suitable bases (such as a hydroxide) may be included to adjust the pH of this vessel solution to from about 7.5 to about 10 (preferably from about 8 to about 9.5).

Solutions A and B are then simultaneously added to the reaction vessel at constant flow rates $A_1$ and $B_1$, respectively, for up to 240 minutes while maintaining a constant pH (generally from about 7.5 to about 10 and preferably from about 8 to about 9.5) and a constant vAg equal to or greater than −50 mV in the reaction vessel. By greater than −50 mV is meant more positive than −50 mV. The vAg is preferably maintained at greater than or equal to 0 mV and more preferably greater than or equal to +50 mV. The ratio of the molar flow rate $A_1$ to the total moles of silver precipitated is generally from about 0.004 to about 0.04 mol/min/mol Ag of the immo-group-containing compound and the ratio of the molar flow rate $B_1$ to the total moles of silver precipitated is generally from about 0.004 to about 0.04 mol Ag/min/mol Ag. Optimum flow rates can be readily determined to obtain particles of a desired aspect ratio and size with routine experimentation. The contents of the reaction vessel are generally kept at a constant temperature of from about 30 to about 75° C. and preferably from about 35 to about 55° C.

Either or both of Solutions A and B can be introduced into the reaction vessel at steady flow rates, or at variable flow rates. For example, the flow rate of the addition of solution B can be increased to flow rate $B_2$ for up to 60 minutes while maintaining constant temperature, pH, and vAg in the reaction vessel. The ratio of flow rate $B_2$ to flow rate $B_1$ is from about 1.4:1 to about 1.8:1. A further change in the flow rate of Solution B can also be made by increasing it to flow rate $B_3$ for up to 60 minutes while maintaining constant temperature, pH and vAg in the reaction vessel. The ratio flow rate $B_3$ to flow rate $B_2$ is from about 1.8:1 to about 2.2:1.

Solution A', if different from solution A, can be similarly added to the reaction vessel at a steady or variable flow. For example, the ratio of the molar flow rate $A'_1$ to the total moles of silver can be from about 0.004 to about 0.04 mol/min/mol Ag. Solution A' may be added to the reaction vessel so that the second organic silver salt is present within a localized portion of the co-precipitate particle. For example, solution A' can be added after at least 75 volume % of solution B has been added to the reaction vessel. More preferably, solution A' is added to provide at least 95 mol % of the second organic silver salt from within about 90 to about 100 volume % of the particle.

The addition of solutions A (and A') and B to the reaction vessel then produces a dispersion or a co-precipitate containing two or more different organic silver salts within the hydrophilic polymer binder or the water-dispersible polymer latex binder. The one or more binders are generally present in the silver salt dispersion in an amount preferably of from about 2 to about 10 weight %. Particularly useful hydrophilic polymer binders include those hydrophilic binders described below in the "Binders" section, and are preferably gelatin or a gelatin derivative.

In addition to the silver salts of one or more suitable nitrogen-containing heterocyclic compounds containing an imino group and the one or more silver salts of mercaptotriazoles, the co-precipitate can contain small amounts of other silver salts. Thus, ternary and quaternary co-precipitates are envisioned.

Representative preparatory conditions and procedures are illustrated in below in the Examples.

Reducing Agents

The thermally developable materials can include one or more suitable reducing agents that would be apparent to one skilled in the art to reduce silver(I) to metallic silver. Preferably, such reducing agents are reductones or ascorbic acids.

A "reductone" reducing agent means a class of unsaturated, di- or poly-enolic organic compounds which, by virtue of the arrangement of the enolic hydroxyl groups with respect to the unsaturated linkages, possess characteristic strong reducing power. The parent compound, "reductone" is 3-hydroxy-2-oxopropionaldehyde (enol form) and has the structure HOCH═CH(OH)—CHO. In some reductones, an amino group, a mono-substituted amino group or an imino group may replace one or more of the enolic hydroxyl groups without affecting the characteristic reducing behavior of the compound. Examples of reductone reducing agents can be found in U.S. Pat. No. 2,691,589 (Henn et al), U.S. Pat. No. 3,615,440 (Bloom), U.S. Pat. No. 3,664,835 (Youngquist et al.), U.S. Pat. No. 3,672,896 (Gabrielson et al.), 3,690,872 (Gabrielson et al.), U.S. Pat. No. 3,816,137 (Gabrielson et al.), U.S. Pat. No. 4,371,603 (Bartels-Keith et al.), U.S. Pat. No. 5,712,081 (Andriesen et al.), and U.S. Pat. No. 5,427,905 (Freedman et al.), all of which references are incorporated herein by reference.

An "ascorbic acid" reducing agent (also referred to as a developer or developing agent) means ascorbic acid, complexes thereof, and derivatives thereof. Ascorbic acid reducing agents are described in a considerable number of publications in photographic processes, including U.S. Pat. No. 5,236,816 (Purol et al.) and references cited therein.

Useful ascorbic acid and reductone reducing agents include ascorbic acid and the analogues, isomers, complexes, and derivatives thereof. Such compounds include, but are not limited to, D- or L-ascorbic acid, 2,3-dihydroxy-2-cyclohexen-1-one, 3,4-dihydroxy-5-phenyl-2 (5H)-furanone, sugar-type derivatives thereof (such as sorboascorbic acid, γ-lactoascorbic acid, 6-desoxy-L-ascorbic acid, L-rhamnoascorbic acid, imino-6-desoxy-L-ascorbic acid, glucoascorbic acid, fucoascorbic acid, glucoheptoascorbic acid, maltoascorbic acid, L-arabosascorbic acid), sodium ascorbate, niacinamide ascorbate, potassium ascorbate, isoascorbic acid (or L-erythroascorbic acid), and salts thereof (such as alkali metal, ammonium or others known in the art), endiol type ascorbic acid, an enaminol type ascorbic acid, a thioenol type ascorbic acid, and an enamin-thiol type ascorbic acid, as described for example in EP 0 585 792 A1 (Passarella et al.), EP 0 573 700 A1 (Lingier et al.), EP 0 588 408 A1 (Hieronymus et al.), U.S. Pat. No. 5,498,511 (Yamashita et al.), U.S. Pat. No. 5,089,819 (Knapp), U.S. Pat. No. 5,278,035 (Knapp), U.S. Pat. No. 5,384,232 (Bishop et al.), U.S. Pat. No. 5,376,510 (Parker et al.), and U.S. Pat. No. 2,688,549 (James et al.), Japanese Kokai 7-56286 (Toyoda), and *Research Disclosure*, publication 37152, March 1995. Mixtures of these developing agents can be used if desired.

Particularly useful reducing agents are ascorbic acid mono- or di-fatty acid esters such as the monolaurate, monomyristate, monopalmitate, monostearate, monobehenate, diluarate, distearate, dipalmitate, dibehenate, and dimyristate derivatives of ascorbic acid as described in U.S.

Pat. No. 3,832,186 (Masuda et al.) and U.S. Pat. No. 6,309,814 (Ito). Preferred ascorbic acid reducing agents and their methods of preparation are those described in copending and commonly assigned U.S. Ser. No. 10/764,704 (filed on Jan. 26, 2004 by Ramsden et al.) and those described in copending and commonly assigned U.S. Serial No. 10/935,645 (filed on even date herewith by Brick, Ramsden, and Lynch and entitled "Developer Dispersions for Thermally Developable Materials") both of which are incorporated herein by reference. A preferred reducing agent is L-ascorbic acid 6-O-palmitate.

The reducing agent (or mixture thereof) described herein is generally present as 1 to 10% (dry weight) of the emulsion layer. In multilayer constructions, if the reducing agent is added to a layer other than an emulsion layer, slightly higher proportions, of from about 2 to 15 weight % may be more desirable. Co-developers may be present generally in an amount of from about 0.001% to about 1.5% (dry weight) of the emulsion layer coating.

Other Addenda

The photothermographic materials can also contain other additives such as shelf-life stabilizers, antifoggants, contrast enhancing agents, development accelerators, acutance dyes, post-processing stabilizers or stabilizer precursors, thermal solvents (also known as melt formers), humectants, and other image-modifying agents as would be readily apparent to one skilled in the art.

To further control the properties of photothermographic materials, (for example, contrast, Dmin, speed, or fog), it may be preferable to add one or more heteroaromatic mercapto compounds or heteroaromatic disulfide compounds of the formulae Ar—S—$M^1$ and Ar—S—S—Ar, wherein $M^1$ represents a hydrogen atom or an alkali metal atom and Ar represents a heteroaromatic ring or fused heteroaromatic ring containing one or more of nitrogen, sulfur, oxygen, selenium, or tellurium atoms. Preferably, the heteroaromatic ring comprises benzimidazole, naphthimidazole, benzothiazole, naphthothiazole, benzoxazole, naphthoxazole, benzoselenazole, benzotellurazole, imidazole, oxazole, pyrazole, triazole, thiazole, thiadiazole, tetrazole, triazine, pyrimidine, pyridazine, pyrazine, pyridine, purine, quinoline, or quinazolinone. Useful heteroaromatic mercapto compounds are described as supersensitizers in EP 0 559 228 B1 (Philip Jr. et al.).

The photothermographic materials can be further protected against the production of fog and can be stabilized against loss of sensitivity during storage. Suitable antifoggants and stabilizers that can be used alone or in combination include thiazolium salts as described in U.S. Pat. No. 2,131,038 (Brooker et al.) and U.S. Pat. No. 2,694,716 (Allen), azaindenes as described in U.S. Pat. No. 2,886,437 (Piper), triazaindolizines as described in U.S. Pat. No. 2,444,605 (Heimbach), urazoles as described in U.S. Pat. No. 3,287,135 (Anderson), sulfocatechols as described in U.S. Pat. No. 3,235,652 (Kennard), oximes as described in GB 623,448 (Carrol et al.), polyvalent metal salts as described in U.S. Pat. No. 2,839,405 (Jones), thiuronium salts as described in U.S. Pat. No. 3,220,839 (Herz), compounds having —$SO_2CBr_3$ groups as described in U.S. Pat. No. 5,594,143 (Kirk et al.) and U.S. Pat. No. 5,374,514 (Kirk et al.), and 2-(tribromomethylsulfonyl)quinoline compounds as described in U.S. Pat. No. 5,460,938 (Kirk et al.).

The photothermographic materials may also include one or more polyhalo antifoggants that include one or more polyhalo substituents including but not limited to, dichloro, dibromo, trichloro, and tribromo groups. The antifoggants can be aliphatic, alicyclic or aromatic compounds, including aromatic heterocyclic and carbocyclic compounds. Particularly useful antifoggants of this type are polyhalo antifoggants, such as those having a —$SO_2C(X')_3$ group wherein X' represents the same or different halogen atoms.

Another class of useful antifoggants includes those compounds described in U.S. Pat. No. 6,514,678 (Burgmaier et al.), incorporated herein by reference.

Advantageously, the photothermographic materials also include one or more thermal solvents (also called "heat solvents," "thermosolvents," "melt formers," "melt modifiers," "eutectic formers," "development modifiers," "waxes," or "plasticizers").

By the term "thermal solvent" is meant an organic material that becomes a plasticizer or liquid solvent for at least one of the imaging layers upon heating at a temperature above 60° C. Useful for that purpose are polyethylene glycols having a mean molecular weight in the range of 1,500 to 20,000, urea, methyl sulfonamide, ethylene carbonate, and compounds described as thermal solvents in *Research Disclosure*, December 1976, item 15027, pp. 26–28. Other representative examples of such compounds include niacinamide, hydantoin, 5,5-dimethylhydantoin, salicylanilide, succinimide, phthalimide, N-potassiumphthalimide, N-hydroxyphthalimide, N-hydroxy-1,8-naphthalimide, phthalazine, 1-(2H)-phthalazinone, 2-acetylphthalazinone, benzanilide, 1,3-dimethylurea, 1,3-diethylurea, 1,3-diallylurea, meso-erythritol, D-sorbitol, tetrahydro-2-pyrimidone, glycouril, 2-imidazolidone, 2-imidazolidone-4-carboxylic acid, and benzenesulfonamide. Combinations of these compounds can also be used including, for example, a combination of succinimide and 1,3-dimethylurea.

It may be advantageous to include a base-release agent or base precursor in the photothermographic materials. Representative base-release agents or base precursors include guanidinium compounds, such as guanidinium trichloroacetate, and other compounds that are known to release a base but do not adversely affect photographic silver halide materials, such as phenylsulfonyl acetates as described in U.S. Pat. No. 4,123,274 (Knight et al.).

Phosphors

In some embodiments, it is also effective to incorporate X-radiation-sensitive phosphors in the photothermographic materials as described in U.S. Pat. No. 6,573,033 (Simpson et al.) and U.S. Pat. No. 6,440,649 (Simpson et al.), both of which are incorporated herein by reference. Other useful phosphors are primarily "activated" phosphors known as phosphate phosphors and borate phosphors. Examples of these phosphors are rare earth phosphates, yttrium phosphates, strontium phosphates, or strontium fluoroborates (including cerium activated rare earth or yttrium phosphates, or europium activated strontium fluoroborates) as described in U.S. Ser. No. 10/826,500 (filed Apr. 16, 2004 by Simpson, Sieber, and Hansen).

The one or more phosphors used in the practice of this invention are present in the photothermographic materials in an amount of at least 0.1 mole per mole, and preferably from about 0.5 to about 20 mole per mole, of total silver in the photothermographic material.

Binders

The photosensitive silver halide (if present), the coprecipitate of the first and second organic silver salts described above, the reducing agent, antifoggant(s), and any other additives used in the present invention are added to and coated in one or more binders using a suitable aqueous solvent. Thus, aqueous-based formulations are used to prepare the thermographic and photothermographic materials. Mixtures of different types of hydrophilic and/or hydrophobic binders can also be used. Preferably, hydrophilic polymer binders and water-dispersible polymeric latexes are used to provide aqueous-based formulations and thermally developable materials.

Examples of useful hydrophilic polymer binders include, but are not limited to, proteins and protein derivatives, gelatin and gelatin derivatives (hardened or unhardened), cellulosic materials, acrylamide/methacrylamide polymers, acrylic/methacrylic polymers, polyvinyl pyrrolidones, polyvinyl alcohols, poly(vinyl lactams), polymers of sulfoalkyl acrylate or methacrylates, hydrolyzed polyvinyl acetates, polyamides, polysaccharides, and other naturally occurring or synthetic vehicles commonly known for use in aqueous-based photographic emulsions (see for example *Research Disclosure*, item 38957, noted above).

Particularly useful hydrophilic polymer binders are gelatin, gelatin derivatives, polyvinyl alcohols, and cellulosic materials. Gelatin and its derivatives are most preferred, and comprise at least 75 weight % of total binders when a mixture of binders is used.

Aqueous dispersions of water-dispersible polymeric latexes may also be used, alone or with hydrophilic or hydrophobic binders described herein. Such dispersions are described in, for example, U.S. Pat. No. 4,504,575 (Lee), U.S. Pat. No. 6,083,680 (Ito et al), U.S. Pat. No. 6,100,022 (Inoue et al.), U.S. Pat. No. 6,132,949 (Fujita et al.), U.S. Pat. No. 6,132,950 (Ishigaki et al.), U.S. Pat. No. 6,140,038 (Ishizuka et al.), U.S. Pat. No. 6,150,084 (Ito et al.), U.S. Pat. No. 6,312,885 (Fujita et al.), and U.S. Pat. No. 6,423,487 (Naoi), all of which are incorporated herein by reference.

Minor amounts (less than 50 weight % based on total binder weight) of hydrophobic binders (not in latex form) may also be used. Examples of typical hydrophobic binders include polyvinyl acetals, polyvinyl chloride, polyvinyl acetate, cellulose acetate, cellulose acetate butyrate, polyolefins, polyesters, polystyrenes, polyacrylonitrile, polycarbonates, methacrylate copolymers, maleic anhydride ester copolymers, butadiene-styrene copolymers, and other materials readily apparent to one skilled in the art. The polyvinyl acetals (such as polyvinyl butyral and polyvinyl formal), cellulose ester polymers, and vinyl copolymers (such as polyvinyl acetate and polyvinyl chloride) are preferred. Particularly suitable binders are polyvinyl butyral resins that are available under the name BUTVAR® from Solutia, Inc. (St. Louis, Mo.) and PIOLOFORM® from Wacker Chemical Company (Adrian, Mich.) and cellulose ester polymers.

Hardeners for various binders may be present if desired. Useful hardeners are well known and include diisocyanates as described for example, in EP 0 600 586B1 (Philip, Jr. et al.) and vinyl sulfone compounds as described in U.S. Pat. No. 6,143,487 (Philip, Jr. et al.), and EP 0 640 589A1 (Gathmann et al.), aldehydes and various other hardeners as described in U.S. Pat. No. 6,190,822 (Dickerson et al.).

Where the proportions and activities of the photothermographic materials require a particular developing time and temperature, the binder(s) should be able to withstand those conditions. Generally, it is preferred that the binder does not decompose or lose its structural integrity at 120° C. for 60 seconds. It is more preferred that it does not decompose or lose its structural integrity at 177° C. for 60 seconds.

The binder(s) is used in an amount sufficient to carry the components dispersed therein. Preferably, a binder is used at a level of about 10% by weight to about 90% by weight, and more preferably at a level of about 20% by weight to about 70% by weight, based on the total dry weight of the layer in which it is included. The amount of binders on opposing sides of the support in double-sided materials may be the same or different.

Support Materials

The thermally developable materials comprise a polymeric support that is preferably a flexible, transparent film that has any desired thickness and is composed of one or more polymeric materials. They are required to exhibit dimensional stability during thermal development and to have suitable adhesive properties with overlying layers. Useful polymeric materials for making such supports include, but are not limited to, polyesters, cellulose acetate and other cellulose esters, polyvinyl acetal, polyolefins, polycarbonates, and polystyrenes. Preferred supports are composed of polymers having good heat stability, such as polyesters and polycarbonates. Polyethylene terephthalate film is a particularly preferred support. Support materials may also be treated or annealed to reduce shrinkage and promote dimensional stability.

It is also useful to use supports comprising dichroic mirror layers as described in U.S. Pat. No. 5,795,708 (Boutet), incorporated herein by reference.

Also useful are transparent, multilayer, polymeric supports comprising numerous alternating layers of at least two different polymeric materials that preferably reflect at least 50% of actinic radiation in the range of wavelengths to which the photothermographic material is sensitive. Such polymeric supports are described in U.S. Pat. No. 6,630,283 (Simpson et al.) that is incorporated herein by reference.

Support materials can contain various colorants, pigments, antihalation or acutance dyes if desired. For example, blue-tinted supports are particularly useful for providing images useful for medical diagnosis. Support materials may be treated using conventional procedures (such as corona discharge) to improve adhesion of overlying layers, or subbing or other adhesion-promoting layers can be used.

Thermographic and Photothermographic Formulations and Constructions

The imaging components are prepared in a formulation containing a hydrophilic polymer binder (such as gelatin, a gelatin-derivative, or a cellulosic material) or a water-dispersible polymer in latex form in an aqueous solvent such as water or water-organic solvent mixtures to provide aqueous-based coating formulations. Thus, the thermally developable imaging layers on one or both sides of the support are prepared and coated out of aqueous formulations. In preferred embodiments, each thermally developable imaging layers has a pH less than 7. This pH value can be determined using a surface pH electrode after placing a drop of $KNO_3$ solution on the sample surface. Such electrodes are available from Coming (Corning, N.Y.).

The thermally developable materials can contain plasticizers and lubricants such as poly(alcohols) and diols as described in U.S. Pat. No. 2,960,404 (Milton et al.), fatty acids or esters as described in U.S. Pat. No. 2,588,765 (Robijns) and U.S. Pat. No. 3,121,060 (Duane), and silicone resins as described in GB 955,061 (DuPont). The materials can also contain inorganic or organic matting agents as described in U.S. Pat. No. 2,992,101 (Jelley et al.) and U.S. Pat. No. 2,701,245 (Lynn). Polymeric fluorinated surfactants may also be useful in one or more layers as described in U.S. Pat. No. 5,468,603 (Kub).

U.S. Pat. No. 6,436,616 (Geisler et al.), incorporated herein by reference, describes various means of modifying photothermographic materials to reduce what is known as the "woodgrain" effect, or uneven optical density.

The thermally developable materials can include one or more antistatic agents in any of the layers on either or both sides of the support. Conductive components include soluble salts, evaporated metal layers, or ionic polymers as described in U.S. Pat. No. 2,861,056 (Minsk) and U.S. Pat. No. 3,206,312 (Sterman et al.), insoluble inorganic salts as described in U.S. Pat. No. 3,428,451 (Trevoy), electroconductive underlayers as described in U.S. Pat. No. 5,310,640 (Markin et al.), electronically-conductive metal antimonate particles as described in U.S. Pat. No. 5,368,995 (Christian et al.), and electrically-conductive metal-containing particles dispersed in a polymeric binder as described in EP 0 678 776 A1 (Melpolder et al.). Particularly useful conductive particles are the non-acicular metal antimonate particles described in U.S. Pat. No. 6,689,546 (LaBelle et al.). All of the above patents and patent applications are incorporated herein by reference.

Still other conductive compositions include one or more fluoro-chemicals each of which is a reaction product of $R_f$—$CH_2CH_2$—$SO_3H$ with an amine wherein $R_f$ comprises 4 or more fully fluorinated carbon atoms as described in U.S. Pat. No. 6,699,648 (Sakizadeh et al.) that is incorporated herein by reference.

Additional conductive compositions include one or more fluoro-chemicals described in more detail in U.S. Pat. No. 6,762,013 (Sakizadeh et al.) that is incorporated herein by reference.

For duplitized thermally developable materials, each side of the support can include one or more of the same or different imaging layers, interlayers, and protective topcoat layers. In such materials preferably a topcoat is present as the outermost layer on both sides of the support. The thermally developable layers on opposite sides can have the same or different construction and can be overcoated with the same or different protective layers. The co-precipitates can be the same or different on opposite sides of the support.

Layers to promote adhesion of one layer to another are also known, as described in U.S. Pat. No. 5,891,610 (Bauer et al.), U.S. Pat. No. 5,804,365 (Bauer et al.), and U.S. Pat. No. 4,741,992 (Przezdziecki). Adhesion can also be promoted using specific polymeric adhesive materials as described for example in U.S. Pat. No. 5,928,857 (Geisler et al.).

Layers to reduce emissions from the film may also be present, including the polymeric barrier layers described in U.S. Pat. No. 6,352,819 (Kenney et al.), U.S. Pat. No. 6,352,820 (Bauer et al.), U.S. Pat. No. 6,420,102 (Bauer et al.), U.S. Pat. No. 6,667,148 (Rao et al.), and U.S. Pat. No. 6,746,831 (Hunt), all incorporated herein by reference.

The formulations described herein (including the thermally developable formulations) can be coated by various coating procedures including wire wound rod coating, dip coating, air knife coating, curtain coating, slide coating, or extrusion coating using hoppers of the type described in U.S. Pat. No. 2,681,294 (Beguin). Layers can be coated one at a time, or two or more layers can be coated simultaneously by the procedures described in U.S. Pat. No. 2,761,791 (Russell), U.S. Pat. No. 4,001,024 (Dittman et al.), U.S. Pat. No. 4,569,863 (Keopke et al.), U.S. Pat. No. 5,340,613 (Hanzalik et al.), U.S. Pat. No. 5,405,740 (LaBelle), U.S. Pat. No. 5,415,993 (Hanzalik et al.), U.S. Pat. No. 5,525,376 (Leonard), U.S. Pat. No. 5,733,608 (Kessel et al.), U.S. Pat. No. 5,849,363 (Yapel et al.), U.S. Pat. No. 5,843,530 (Jerry et al.), and U.S. Pat. No. 5,861,195 (Bhave et al.), and GB 837,095 (Ilford). A typical coating gap for the emulsion layer can be from about 10 to about 750 μm, and the layer can be dried in forced air at a temperature of from about 20° C. to about 100° C. It is preferred that the thickness of the layer be selected to provide maximum image densities greater than about 0.2, and more preferably, from about 0.5 to 5.0 or more, as measured by a MacBeth Color Densitometer Model TD 504.

Simultaneously with or subsequently to application of an emulsion formulation to the support, a protective overcoat formulation can be applied over the emulsion formulation.

Preferably, two or more layer formulations are applied simultaneously to a film support using slide coating techniques, the first layer being coated on top of the second layer while the second layer is still wet.

In other embodiments, a "carrier" layer formulation comprising a single-phase mixture of the two or more polymers may be applied directly onto the support and thereby located underneath the emulsion layer(s) as described in U.S. Pat. No. 6,355,405 (Ludemann et al.), incorporated herein by reference. The carrier layer formulation can be applied simultaneously with application of the emulsion layer formulation.

Mottle and other surface anomalies can be reduced in the materials by incorporation of a fluorinated polymer as described in U.S. Pat. No. 5,532,121 (Yonkoski et al.) or by using particular drying techniques as described in U.S. Pat. No. 5,621,983 (Ludemann et al.).

While the first and second layers can be coated on one side of the film support, manufacturing methods can also include forming on the opposing or backside of the polymeric support, one or more additional layers, including a conductive layer, antihalation layer, or a layer containing a matting agent (such as silica), or a combination of such layers. Alternatively, one backside layer can perform all of the desired functions.

To promote image sharpness, photothermographic materials can contain one or more layers containing acutance and/or antihalation dyes that are chosen to have absorption close to the exposure wavelength and are designed to absorb scattered light. One or more antihalation compositions may be incorporated into one or more antihalation backing layers, antihalation underlayers, or as antihalation overcoats.

Dyes useful as antihalation and acutance dyes include squaraine dyes described in U.S. Pat. No. 5,380,635 (Gomez et al.) and U.S. Pat. No. 6,063,560 (Suzuki et al.), and EP 1 083 459A1 (Kimura), indolenine dyes described in EP 0 342 810A1 (Leichter), and cyanine dyes described in U.S. Patent Application Publication 2003/0162134 (Hunt et al.), all incorporated herein by reference.

It may also be useful to employ compositions including acutance or antihalation dyes that will decolorize or bleach with heat during processing, as described in U.S. Pat. No. 5,135,842 (Kitchin et al.), U.S. Pat. No. 5,266,452 (Kitchin et al.), U.S. Pat. No. 5,314,795 (Helland et al.), and U.S. Pat. No. 6,306,566, (Sakurada et al.), and Japenese Kokai 2001-142175 (Hanyu et al.) and 2001-183770 (Hanye et al.). Useful bleaching compositions are also described in Japanese Kokai 11-302550 (Fujiwara), 2001-109101 (Adachi), 2001-51371 (Yabuki et al.), and 2000-029168 (Noro). All of the noted publications are incorporated herein by reference.

Other useful heat-bleachable backside antihalation compositions can include an infrared radiation absorbing compound such as an oxonol dye or other compounds used in combination with a hexaarylbiimidazole (also known as a "HABI"), or mixtures thereof. HABI compounds are described in U.S. Pat. No. 4,196,002 (Levinson et al.), U.S. Pat. No. 5,652,091 (Perry et al.), and U.S. Pat. No. 5,672,562

(Perry et al.), all incorporated herein by reference. Examples of such heat-bleachable compositions are described for example in U.S. Pat. No. 6,455,210 (Irving et al.), U.S. Pat. No. 6,514,677 (Ramsden et al.), and 6,558,880 (Goswami et al.), all incorporated herein by reference.

Under practical conditions of use, these compositions are heated to provide bleaching at a temperature of at least 90° C. for at least 0.5 seconds (preferably, at a temperature of from about 100° C. to about 200° C. for from about 5 to about 20 seconds).

Imaging/Development

The photothermographic materials can be imaged in any suitable manner consistent with the type of material, using any suitable imaging source (typically some type of radiation or electronic signal). In some embodiments, the materials are sensitive to radiation in the range of from about at least 100 nm to about 1400 nm, and normally from about 300 nm to about 750 nm (preferably from about 300 to about 600 nm, more preferably from about 300 to about 450 nm, even more preferably from a wavelength of from about 360 to 420 nm, and most preferably from about 380 to about 420 nm), using appropriate spectral sensitizing dyes.

Imaging can be achieved by exposing the photothermographic materials to a suitable source of radiation to which they are sensitive, including ultraviolet radiation, visible light, near infrared radiation, and infrared radiation to provide a latent image. Suitable exposure means are well known and include incandescent or fluorescent lamps, xenon flash lamps, lasers, laser diodes, light emitting diodes, infrared lasers, infrared laser diodes, infrared light-emitting diodes, infrared lamps, or any other ultraviolet, visible, or infrared radiation source readily apparent to one skilled in the art such as described in *Research Disclosure*, item 38957 (noted above).

In preferred embodiments, the photothermographic materials can be indirectly imaged using an X-radiation imaging source and one or more prompt-emitting or storage X-ray sensitive phosphor screens adjacent to the photothermographic material. The phosphors emit suitable radiation to expose the photothermographic material. Preferred X-ray screens are those having phosphors emitting in the blue region of the spectrum (from 400 to 500 nm) and those emitting in the green region of the spectrum (from 500 to 600 nm).

In other embodiments, the photothermographic materials can be imaged directly using an X-radiation imaging source to provide a latent image.

Thermal development conditions will vary, depending on the construction used but will typically involve heating the photothermographic material at a suitably elevated temperature, for example, at from about 50° C. to about 250° C. (preferably from about 80° C. to about 200° C. and more preferably from about 100° C. to about 200° C.) for a sufficient period of time, generally from about 1 to about 120 seconds. Heating can be accomplished using any suitable heating means. A preferred heat development procedure for photothermographic materials includes heating at from 130° C. to about 165° C. for from about 3 to about 25 seconds.

Imaging of the thermographic materials is carried out using a suitable imaging source of thermal energy such as a thermal print head or a modulated scanning laser beam.

Use as a Photomask

In some embodiments, the photothermographic and thermographic materials are sufficiently transmissive in the range of from about 350 to about 450 nm in non-imaged areas to allow their use in a method where there is a subsequent exposure of an ultraviolet or short wavelength visible radiation sensitive imageable medium. The heat-developed materials absorb ultraviolet or short wavelength visible radiation in the areas where there is a visible image and transmit ultraviolet or short wavelength visible radiation where there is no visible image. The materials may then be used as a mask and positioned between a source of imaging radiation (such as an ultraviolet or short wavelength visible radiation energy source) and an imageable material that is sensitive to such imaging radiation, such as a photopolymer, diazo material, photoresist, or photosensitive printing plate.

These embodiments of the imaging method of this invention are carried out using the following Steps A through D:

A) imagewise exposing a photothermographic material having a transparent support to form a latent image, B) simultaneously or sequentially, heating the exposed photothermographic material to develop the latent image into a visible image, C) positioning the exposed and photothermographic material with the visible image therein between a source of imaging radiation and an imageable material that is sensitive to the imaging radiation, and D) exposing the imageable material to the imaging radiation through the visible image in the exposed and photothermographic material to provide an image in the imageable material.

Imaging Assemblies

In some embodiments, the photothermographic materials are used or arranged in association with one or more phosphor intensifying screens and/or metal screens in what is known as "imaging assemblies." Duplitized visible light sensitive photothermographic materials are preferably used in combination with two adjacent intensifying screens, one screen in the "front" and one screen in the "back" of the material. The front and back screens can be appropriately chosen depending upon the type of emissions desired, the desired photicity, and emulsion speeds. The imaging assemblies can be prepared by arranging the photothermographic material and one or more phosphor intensifying screens in a suitable holder (often known as a cassette), and appropriately packaging them for transport and imaging uses.

There are a wide variety of phosphors known in the art that can be formulated into phosphor intensifying screens as described in hundreds of publications. U.S. Pat. No. 6,573,033 (noted above) describes phosphors that can be used in this manner. Particularly useful phosphors are those that emit radiation having a wavelength of from about 300 to about 450 nm and preferably radiation having a wavelength of from about 360 to about 420 nm.

Preferred phosphors useful in the phosphor intensifying screens include one or more alkaline earth fluorohalide phosphors and especially the rare earth activated (doped) alkaline earth fluorohalide phosphors. Particularly useful phosphor intensifying screens include a europium-doped barium fluorobromide ($BaFBr_2$:Eu) phosphor. Other useful phosphors are described in U.S. Pat. No. 6,682,868 (Dickerson et al.) and references cited therein, all incorporated herein by reference.

The following examples are provided to illustrate the practice of the present invention and the invention is not meant to be limited thereby.

Materials and Methods for the Examples:

All materials used in the following examples can be prepared using known synthetic procedures or are readily available from standard commercial sources, such as Aldrich Chemical Co. (Milwaukee, Wis.) unless otherwise specified. All percentages are by weight unless otherwise indicated.

BZT is benzotriazole. AGBZT is silver benzotriazole.

BYK-022 is a defoamer and is available from Byk-Chemie Corp. (Wallingford, Conn.).

CELVOL®V203 S is a polyvinyl alcohol and is available from Celanese Corp. (Dallas, Tex.).

L-Ascorbic acid 6-O-palmitate is available from Alfa Aesar Corp., (Ward Hill, Mass.).

TRITON®X-114 is a surfactant and is available from Dow Chemical Corp. (Midland Mich.).

Densitometry measurements were carried out on an X-Rite® Model 301 densitometer that is available from X-Rite Inc. (Grandville, Mich.).

Compounds A-1 and A-2 are described in U.S. Pat. No. 6,605,418 (noted above) and are believed to have the following structures:

(A-1)

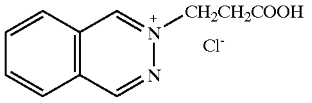

(A-2)

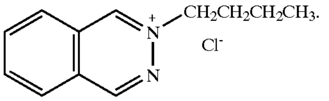

Compound SS-1a is described in U.S. Pat. No. 6,296,998 (Eikenberry et al.) and is believed to have the following structure:

(SS-1a)

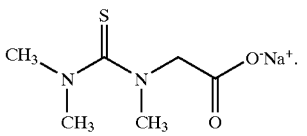

Bisvinyl sulfonyl methane (VS-1) is 1,1'(methylenebis (sulfonyl))-bis-ethene and is described in EP 0 640 589 A1 (Gathmann et al.). It is believed to have the following structure:

(VS-1)

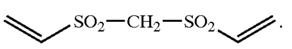

Compound T-1 is 2,4-dihydro-4-(phenylmethyl)-3H-1,2,4-triazole-3-thione. It is believed to have the structure shown above. It may also exist as the thione tautomer. The silver salt of this compound is referred to as AgT-1. The sodium salt of this compound is referred to as NaT-1.

Gold sensitizer Compound GS-1 is believed to have the following structure.

(GS-1)

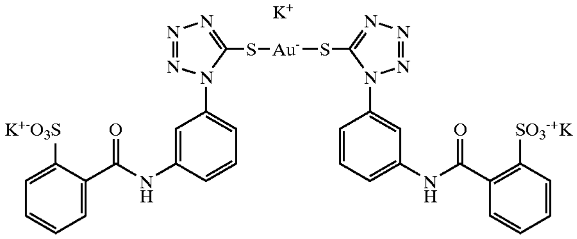

Blue sensitizing dye SSD-1 is believed to have the following structure.

(SSD-1)

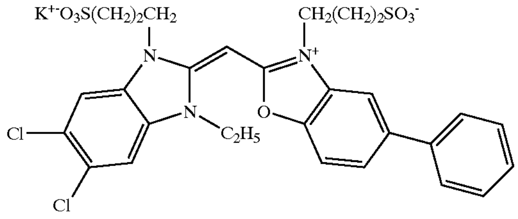

Densitometry

Densitometry measurements were made on a custom built computerized scanning-densitometer that meets ISO Standards 5-2 and 5-3 and takes an optical density reading every 0.33 mm. The results are believed to be comparable to measurements from commercially available densitometers.

Density of the wedges was measured using a filter appropriate to the sensitivity of the photothermographic material to obtain graphs of density versus log exposure (that is, D log E curves). Dmin is the density of the non-exposed areas after development and it is the average of the eight lowest density values.

Preparation of Silver Benzotriazole Emulsions

Preparation of Pure AGBZT Emulsions:

Comparative gelatin emulsions C-1 and C-4 of silver benzotriazole (AgBZT) were prepared as described below. Amounts listed as g/kg refer to grams of material per kilogram of solution of that material.

A stirred reaction vessel was charged with 900 g of lime-processed gelatin, and 6 kg of deionized water.

Solution A: A solution containing 216 g/kg of benzotriazole, 710 g/kg of deionized water, and 74 g/kg of sodium hydroxide was prepared.

The mixture in the reaction vessel was adjusted to a pH of 8.9 with 2.5N sodium hydroxide solution. The small amount of Solution A shown in TABLE II was added to adjust the solution vAg. The temperature of the reaction vessel was maintained at approximately 50° C.

Solution B: A second solution containing 362 g/kg of silver nitrate and 638 g/kg of deionized water was prepared.

Solutions A and B were then added to the reaction vessel by conventional controlled double-jet addition at the Solution B flow rates given in TABLE III. The rate of addition of Solution A was controlled to maintain constant vAg and pH in the reaction vessel.

For example, in the preparation of comparative emulsion C-1, Solution B was initially added at a flow rate of about 25 ml/min for 20 minutes, the flow rate of Solution B was then accelerated over 41 minutes to about 40 ml/min, and finally the flow rate of Solution B was further accelerated over 30 minutes to about 80 ml/min.

The AgBZT emulsions were washed by conventional ultrafiltration process as described in *Research Disclosure*, Vol. 131, March 1975, Item 13122. The pH of AgBZT emulsions was adjusted to 6.0 using 2.0N sulfuric acid.

Preparation of AgBZT/AgT-1 Co-Precipitated Emulsions:

Co-precipitated AgBZT/AgT-1 comparative emulsions C-2 and C-3, and inventive emulsion samples I-1 through 1-9 were prepared as described below.

A stirred reaction vessel was charged with 900 g of lime-processed gelatin, and 6 kg of deionized water.

Solution A: A solution containing 216 g/kg of benzotriazole, 710 g/kg of deionized water, and 74 g/kg of sodium hydroxide was prepared.

The mixture in the reaction vessel was adjusted to a pH of 8.9 with 2.5N sodium hydroxide solution. The small amount of Solution A shown in TABLE II, was added to adjust the solution vAg. The temperature of the reaction vessel was maintained at approximately 50° C.

Solution B: A second solution containing 362 g/kg of silver nitrate and 638 g/kg of deionized water was prepared.

Solution A': A third series of solutions containing benzotriazole, compound T-1, sodium hydroxide and de-ionized water was prepared having the compositions shown in TABLE IV.

Solutions A and B were then added to the reaction vessel by conventional controlled double-jet addition at the Solution B flow rates given in TABLE III. The rate of addition of Solution A was controlled to maintain constant vAg and pH in the reaction vessel. For the proportion of the silver nitrate (Solution B) addition, indicated in TABLE IV, Solution A was replaced with Solution A'. Solutions B and A' were then added to the reaction vessel by conventional controlled double-jet addition, while maintaining constant vAg and pH in the reaction vessel.

For example, in the preparation of comparative emulsion C-2, Solution B was added at a flow rate of about 50 ml/min for 22 minutes, along with Solution A, by conventional controlled double-jet addition. At this point, about 30% of the total amount of Solution B had been added during the precipitation. Solution A was then replaced with Solution A'. Solutions B and A' were then added at a flow rate of about 50 ml/min for 7.5 minutes by conventional controlled double-jet addition, while maintaining constant vAg and pH in the reaction vessel. At this point, the about 40% of the total amount of Solution B had been added during the precipitation. Solution A' was then replaced with Solution A. Solutions A and B were then added at a flow rate of about 50 ml/min for 7.5 minutes by conventional controlled double-jet addition, while maintaining constant vAg and pH in the reaction vessel. The flow rate of Solution B was then accelerated over 27 minutes to about 85 ml/min, while maintaining constant vAg and pH in the reaction vessel.

The AgBZT/AgT-1 co-precipitated emulsions were washed by conventional ultrafiltration process as described in *Research Disclosure*, Vol. 131, March 1975, Item 13122. The pH of AgBZT/AgT-1 emulsions was adjusted to 6.0 using 2.0N sulfuric acid.

Emulsion C—I contained no AgT-1.

Emulsions C-2 and C-3 had a core-shell construction with a core of AgBZT surrounded by a shell of AgBZT/AgT-1, further surrounded by a surface shell of AgBZT. The AgT-1 was not within 75 volume % of the surface of the particle.

Emulsion C-4 contained no AgT-1.

Emulsions I-1 through I-7 and 1-9 had core-shell structures with a core of AgBZT surrounded by a shell containing a various quantities of silver AgBZT/AgT-1. The AgT-1 was in the surface layer.

Emulsion I-8 had 95 mol % of AgT-1 within 75 to 85 volume % of the surface.

TABLE II

| Emulsion | Amount of Solution A Added [g] | Measured vAg [mV] | pAg |
|---|---|---|---|
| C-1 | 0.8 | 80 | 8.26 |
| C-2 | 38.5 | 0 | 9.50 |
| C-3 | 38.5 | 0 | 9.50 |
| C-4 | 5.0 | 60 | 8.58 |
| I-1 | 0.8 | 80 | 8.26 |
| I-2 | 0.8 | 80 | 8.26 |
| I-3 | 0.8 | 80 | 8.26 |
| I-4 | 38.5 | 0 | 9.50 |
| I-5 | 38.5 | 0 | 9.50 |
| I-6 | 38.5 | 0 | 9.50 |
| I-7 | 5.0 | 60 | 8.58 |
| I-8 | 38.5 | 0 | 9.50 |
| I-9 | 5.0 | 60 | 8.58 |

TABLE III

| Growth [mV] | | Solution B flow rate [ml/min] | Time [min] |
|---|---|---|---|
| Emulsions C-1, I-1, I-2, I-3 | | | |
| 80 | Addition 1 | 25 | 20 |
| 80 | Addition 2 | 25–40 | 41 |
| 80 | Addition 3 | 40–80 | 30 |
| Emulsions C-4, I-7, I-9 | | | |
| 60 | Addition 1 | 40 | 12 |
| 60 | Addition 2 | 40–50 | 30 |
| 60 | Addition 3 | 50–85 | 27 |
| Emulsions C-2, C-3, I-4, I-5, I-6, I-8 | | | |
| 0 | Addition 1 | 50 | 37 |
| 0 | Addition 2 | 50–85 | 27 |

TABLE IV

| Emulsion | Solution A': Amount of BZT [g/kg] | Solution A': Amount of T-1 [g/kg] | Solution A': Amount of NaOH [g/kg] | Solution A': Amount of $H_2O$ [g/kg] | Percent of Silver Added at Start of Addition of Solution A' | Percent of Silver Added at End of Addition of Solution A' |
|---|---|---|---|---|---|---|
| C-2 | 195 | 79 | 83 | 643 | 30 | 40 |
| C-3 | 195 | 79 | 83 | 643 | 50 | 60 |

TABLE IV-continued

| Emulsion | Solution A': Amount of BZT [g/kg] | Solution A': Amount of T-1 [g/kg] | Solution A': Amount of NaOH [g/kg] | Solution A': Amount of $H_2O$ [g/kg] | Percent of Silver Added at Start of Addition of Solution A' | Percent of Silver Added at End of Addition of Solution A' |
|---|---|---|---|---|---|---|
| I-1 | 0 | 336 | 70 | 594 | 97.7 | 100 |
| I-2 | 0 | 336 | 70 | 594 | 97.4 | 100 |
| I-3 | 0 | 336 | 70 | 594 | 96.9 | 100 |
| I-4 | 0 | 336 | 70 | 594 | 96.9 | 100 |
| I-5 | 190 | 99 | 85 | 626 | 90 | 100 |
| I-6 | 185 | 119 | 87 | 609 | 90 | 100 |
| I-7 | 0 | 336 | 70 | 594 | 96.9 | 100 |
| I-8 | 195 | 79 | 83 | 643 | 75 | 85 |
| I-9 | 0 | 336 | 70 | 594 | 97.9 | 100 |

TABLE V

| Emulsion | Length [μm] | Diameter [μm] | Aspect Ratio | Diameter Width Index |
|---|---|---|---|---|
| C-1 | 0.153 | 0.049 | 3.15 | 1.17 |
| C-2 | 0.153 | 0.085 | 1.82 | 1.17 |
| C-3 | 0.171 | 0.073 | 2.34 | 1.15 |
| C-4 | 0.254 | 0.046 | 5.59 | 1.17 |
| I-1 | 0.392 | 0.058 | 6.78 | 1.15 |
| I-2 | 0.364 | 0.051 | 7.14 | 1.14 |
| I-3 | 0.363 | 0.054 | 6.77 | 1.17 |
| I-4 | 0.232 | 0.059 | 3.95 | 1.13 |
| I-5 | 0.230 | 0.057 | 4.02 | 1.13 |
| I-6 | 0.232 | 0.058 | 4.02 | 1.13 |
| I-7 | 0.235 | 0.048 | 4.92 | 1.12 |
| I-8 | 0.194 | 0.063 | 3.11 | 1.12 |
| I-9 | 0.259 | 0.047 | 5.58 | 1.14 |

EXAMPLE 1

Preparation of Photothermographic Materials

Photothermographic materials of this invention and comparative materials were prepared and evaluated as follows:

Preparation of Ultra-Thin Tabular Grain Silver Halide Emulsions

An ultrathin tabular grain silver halide emulsion was prepared as described in copending and commonly assigned U.S. Ser. No. 10/826,708 (filed on Apr. 16, 2004 by Olm et al.) and incorporated herein by reference.

A vessel equipped with a stirrer was charged with 6 liters of water containing 4.21 g of lime-processed bone gelatin, 4.63 g of sodium bromide, 75.6 mg of potassium iodide, a known antifoamant, and 1.25 ml of 0.1 molar sulfuric acid. It was then held at 39° C. for 5 minutes. Simultaneous additions were then made of 25.187 ml of 0.6 molar silver nitrate and 19.86 ml of 0.75 molar sodium bromide over 30 seconds. Following nucleation, 50 ml of a 0.58% solution of the oxidant Oxone was added. Next, a mixture of 0.749 g of sodium thiocyanate and 30.22 g of sodium chloride dissolved in 136.4 g of water were added and the temperature was increased to 54° C. over 9 minutes. After a 5-minute hold, 100 g of oxidized methionine lime-processed bone gelatin in 1.412 liters of water containing additional antifoamant at 54° C. were then added to the vessel. During the next 38 minutes, the first growth stage took place wherein solutions of 0.6 molar silver nitrate, 0.75 molar sodium bromide, and a 0.29 molar suspension of silver iodide (Lippmann) were added to maintain a nominal uniform iodide level of 4.2 mole %. The flow rates during this growth segment were linearly increased from 9 to 42 ml/min (silver nitrate), from 11.4 to 48.17 ml/min (sodium bromide) and from 0.8 to 3.7 ml/min (silver iodide). The flow rates of the sodium bromide were unbalanced from the silver nitrate in order to increase the pBr during the segment. During the next 64 minutes, the second growth stage took place wherein solutions of 3.5 molar silver nitrate and 4.5 molar sodium bromide and a 0.29 molar suspension of silver iodide (Lippmann) were added to maintain a nominal iodide level of 4.2 mole %. The flow rates during this segment were increased from 8.6 to 38 ml/min (silver nitrate) and from 5.2 to 22.0 ml/min (silver iodide). The flow rates of the sodium bromide were allowed to fluctuate as needed to maintain a constant pBr.

During the next 38 minutes, the third growth stage took place wherein solutions of 3.5 molar silver nitrate, 4.5 molar sodium bromide, and a 0.29 molar suspension of silver iodide (Lippmann) were added to maintain a nominal iodide level of 4.2 mole %. The flow rates during this segment were 42 ml/min (silver nitrate), nominally 32 ml/min (sodium bromide)-pBr control, and 22 ml/min (silver iodide). The temperature was decreased from 54° C. to 35° C. during this segment. At a point approximately 13.5 minutes after the start of this segment, 1 ml of a 2.06 millimolar aqueous solution of $K_2$ $[IrCl_5(5\text{-bromo-thiazole})]$ was added. This corresponds to a concentration of 0.164 ppm to silver halide.

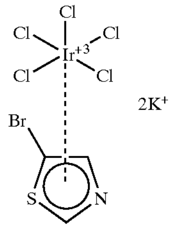

$K_2[IrCl_5(5\text{-bromo-thiazole})]$

A total of 12.6 moles of silver iodobromide (4.2% bulk iodide) were formed. The resulting emulsion was washed via ultrafiltration. Lime-processed bone gelatin (269.3 g) was added along with a biocide and pH and pBr were adjusted to 6 and 2.5, respectively.

The resulting emulsion was examined by Transmission Electron Microscopy. Tabular grains accounted for greater than 99% of the total projected area. The mean ECD of the grains was 2.6 am. The mean tabular thickness was 0.063 μm.

This emulsion was spectrally sensitized with 1.0 mmol of blue sensitizing dye SSD-1 per mole of silver halide. Chemical sensitization was carried out using 0.0055 mmol of sulfur sensitizer (compound SS-1a) per mole of silver halide at 60° C. for 10 minutes.

Preparation of Photothermographic Emulsion Formulations:

Component A (Comparative Samples 1-CS-1 and 1-CS-2): A portion of the AgBZT emulsion prepared above and hydrated gelatin (35% gelatin/65% water) were placed in a beaker and heated to 50° C. for 15 minutes to form a homogeneous dispersion. A 5% aqueous solution of 3-methylbenzothiazolium iodide was added and heated for 15 minutes at 50° C. The sodium salt of benzotriazole was added and stirring was continued for 15 minutes at 50° C. At this point, for Comparative Sample 1-CS-1 solution of Compound NaT-1 was added. For Comparative Sample I—CS-2, no compound T-1 was added. 2.5 N sulfuric acid was added to the resulting melt at 40° C. to adjust the dispersion pH to 5.5.

Component B (Inventive Samples 1-IN-6 through 1-IN-12): A portion of AgBZT/AgT-1 mixed crystal emulsion prepared above and hydrated gelatin (35% gelatin/65% water) were used to prepare a dispersion similar to that of Component A except the addition of Compound T-1 was omitted.

Component C: A portion of the tabular-grain silver halide emulsion prepared above was placed in a beaker and melted by heating at 40° C.

Component D: The materials listed in TABLE VI below were added to water and heated to 50° C.

Coating of Samples:

Components A, C, and D (Comparative) or Components B, C and D (Inventive) were mixed immediately before coating to form a photothermographic emulsion formulation. Each formulation was coated as a single layer on a 7 mil (178 μm) transparent, blue-tinted poly(ethylene terephthalate) film support using a knife coater to form an imaging layer having the dry composition shown below in TABLE VI. Samples were dried at 116° F. (47° C.) for 7 minutes.

TABLE VI

| Component | Compound | Dry Coating Weight [g/m$^2$] |
|---|---|---|
| A | AgBZT | 3.21 |
| A | Lime processed gelatin | 1.28 |
| A | Sodium benzotriazole | 0.10 |
| A | 3-Methyl-benzothiazolium iodide | 0.08 |
| A | Compound NaT-1 | 0.08 |
| B | AgBZT/AgT-1 mixed crystals | 3.21 |
| B | Lime processed gelatin | 1.28 |
| B | Sodium benzotriazole | 0.10 |
| B | 3-Methyl-benzothiazolium iodide | 0.08 |
| C | Silver (from silver halide emulsion) | 0.27 |
| D | Succinimide | 0.14 |
| D | 1,3-Dimethylurea | 0.17 |
| D | A-1 | 0.07 |
| D | VS-1 | 0.07 |
| D | meso-Erythritol | 0.42 |
| D | L-ascorbic acid 6-O-pivalate | 2.90 |

Evaluation of Samples:

Samples of each of the resulting photothermographic materials were imagewise exposed for $10^{-2}$ seconds using an EG&G flash sensitometer equipped with a P-16 filter and a 0.7 neutral density filter. Following exposure, the samples were thermally developed using a heated flatbed processor for 18 seconds at 150° C. to generate continuous tone wedges. These samples provided initial Dmin, Dmax, and photospeed values.

TABLES VII and VIII summarize the initial sensitometry and keeping stability for AgBZT/AgT-1 co-precipitated emulsions.

Comparative sample 1-CS-1 has toner compound T-1 physically mixed with the AgBZT coating melt as would be done in conventional procedures where toners and developer are added into emulsion layer in solution or as solid particle dispersions. The coatings of Comparative Sample 1-CS-1 show a large number of black spots after thermal development, indicating agglomeration of T-1 particles in the coating layer.

Comparative Sample 1-CS-2 contained no toner compound T-1. This sample gave a faint image.

Comparative samples 1-CS-3 and 1-CS-4 contained AgT-1 buried within the particle as an inner layer not within 75 volume % of the surface of the particle.

Inventive samples 1-IN-6 through 1-IN-li all had at least some portion of AgT-1 on the surface of AgBZT/AgT-1 particle.

Inventive sample 1-IN-12 had 95 mol % of AgT-1 within 75 to 85 volume % of the surface.

The results, shown below in TABLES VII and VIII, demonstrate that AgBZT/AgT-1 co-precipitated emulsions gave excellent sensitometry under various preparative conditions. In addition, samples having AgT-1 on the surface of the co-precipitate provided higher photospeed and density than samples having AgT-1 located within 75 to 85 volume % of the outer surface, while maintaining low Dmin. No black spots were found after thermal development.

TABLE VII

| Sample | Emulsion | Invention/ Comparative | Amount of NaT-1 in AgBZT [g/mol Ag] | Amount of T-1 in Co-precipitated AgBZT [g/mol Ag] |
|---|---|---|---|---|
| 1-CS-1 | C-1 | Comparative | 5.0 | 0.0 |
| 1-CS-2 | C-1 | Comparative | 0.0 | 0.0 |
| 1-CS-3 | C-2 | Comparative | 0.0 | 4.0 |
| 1-CS-4 | C-3 | Comparative | 0.0 | 4.0 |
| 1-IN-6 | I-1 | Invention | 0.0 | 4.4 |
| 1-IN-7 | I-2 | Invention | 0.0 | 5.0 |
| 1-IN-8 | I-3 | Invention | 0.0 | 6.0 |
| 1-IN-9 | I-4 | Invention | 0.0 | 6.0 |
| 1-IN-10 | I-5 | Invention | 0.0 | 5.0 |
| 1-IN-11 | I-6 | Invention | 0.0 | 6.0 |
| 1-IN-12 | I-8 | Invention | 0.0 | 4.0 |

TABLE VIII

| Sample | Emulsion | Invention/ Comparative | Dmin | Dmax | Spd-1 | Spd-2 | Image Quality |
|---|---|---|---|---|---|---|---|
| 1-CS-1 | C-1 | Comparative | 0.257 | 2.857 | 5.243 | 4.851 | black spots |
| 1-CS-2 | C-1 | Comparative | 0.301 | 0.434 | **** | **** | Faint Image |
| 1-CS-3 | C-2 | Comparative | 0.237 | 0.529 | 4.176 | **** | no black spots |
| 1-CS-4 | C-3 | Comparative | 0.244 | 0.854 | 4.539 | **** | no black spots |
| 1-IN-6 | I-1 | Invention | 0.254 | 2.683 | 5.144 | 4.663 | no black spots |
| 1-IN-7 | I-2 | Invention | 0.250 | 2.835 | 5.227 | 4.900 | no black spots |
| 1-IN-8 | I-3 | Invention | 0.265 | 2.756 | 5.275 | 4.911 | no black spots |
| 1-IN-9 | I-4 | Invention | 0.261 | 2.447 | 5.194 | 4.846 | no black spots |
| 1-IN-10 | I-5 | Invention | 0.248 | 2.489 | 5.114 | 4.634 | no black spots |
| 1-IN-11 | I-6 | Invention | 0.252 | 2.208 | 5.047 | 4.462 | no black spots |
| 1-IN-12 | I-8 | Invention | 0.248 | 1.305 | 4.754 | 4.085 | no black spots |

****Could not be measured

Natural Age Keeping:

Non-imaged samples were stored in a black polyethylene bag for 6 weeks at ambient room temperature and relative humidity to determine their Natural Age Keeping properties. The samples were then imaged and compared with the freshly imaged samples.

The results, shown below in TABLES IX and X demonstrate that photothermographic materials incorporating a physical mixture of silver benzotriazole (AgBZT) with a 1,2,4-triazine compound (compound T-1) exhibit a greater increase in Dmin, and a greater decrease in Dmax and Speed-2 upon Natural Age Keeping than photothermographic materials incorporating co-precipitated particles of AgBZT/AgT-1.

TABLE IX

| | | | | Nak | | | Nak | |
|---|---|---|---|---|---|---|---|---|
| Sample | Emulsion | Invention/ Comparative | Initial Dmin | 6 Week Dmin | 6 Week ΔDmin | Initial Dmax | 6 Week Dmax | 6 Week ΔDmax |
| 1-CS-1 | C-1 | Comparative | 0.257 | 0.386 | +0.229 | 2.857 | 1.573 | −1.284 |
| 1-IN-6 | I-1 | Invention | 0.254 | 0.280 | +0.026 | 2.683 | 2.142 | −0.541 |
| 1-IN-7 | I-2 | Invention | 0.250 | 0.282 | +0.032 | 2.835 | 1.609 | −1.226 |
| 1-IN-8 | I-3 | Invention | 0.265 | 0.329 | +0.064 | 2.756 | 1.848 | −0.908 |
| 1-IN-9 | I-4 | Invention | 0.261 | 0.279 | +0.018 | 2.447 | 1.105 | −1.342 |

TABLE X

| | | | | NAK | | | NAK | |
|---|---|---|---|---|---|---|---|---|
| Sample | Emulsion | Invention/ Comparative | Initial Spd-1 | 6 Week Spd-1 | 6 Week ΔSpd-1 | Initial Spd-2 | 6 Week Spd-1 | 6 Week ΔSpd-1 |
| 1-CS-1 | C-1 | Comparative | 5.243 | 5.220 | −0.023 | 4.851 | 3.848 | −1.003 |
| 1-IN-6 | I-1 | Invention | 5.144 | 5.318 | +0.174 | 4.663 | 4.726 | +0.099 |
| 1-IN-7 | I-2 | Invention | 5.227 | 5.151 | −0.086 | 4.900 | 4.130 | −0.770 |
| 1-IN-8 | I-3 | Invention | 5.275 | 5.372 | +0.097 | 4.911 | 4.517 | −0.394 |
| 1-IN9 | I-4 | Inventive | 5.194 | 5.076 | −0.118 | 4.846 | **** | **** |

****Could not be measured

Example 2

Preparation of Photothermographic Materials

Photothermographic materials of this invention and comparative materials were prepared and evaluated as follows.

Preparation of Ultra-Thin Tabular Grain Silver Halide Emulsion:

A reaction vessel equipped with a stirrer was charged with 6 liters of water containing 2.1 g of deionized oxidized-methionine lime-processed bone gelatin, 3.49 g of sodium bromide, and an antifoamant (at pH=5.8). The solution was held at 39° C. for 5 minutes. Simultaneous additions were then made of 50.6 ml of 0.3 molar silver nitrate and 33.2 ml of 0.448 molar sodium bromide over 1 minute. Following nucleation, 3.0 ml of a 0.1 M solution of sulfuric acid was added. After 1 minute 15.62 g sodium chloride plus 375 mg of sodium thiocyanate were added and the temperature was increased to 54° C. over 9 minutes. After a 5-minute hold, 79.6 g of deionized oxidized-methionine lime-processed bone gelatin in 1.52 liters of water containing additional antifoamant at 54° C. were then added to the reactor. The reactor temperature was held for 7 minutes (pH=5.6).

During the next 36.8 minutes, the first growth stage took place (at 54° C.), in three segments, wherein solutions of 0.3 molar $AgNO_3$, 0.448 molar sodium bromide, and a 0.16 molar suspension of silver iodide (Lippmann) were added to maintain a nominal uniform iodide level of 3.2 mole %. The flow rates during this growth stage were increased from 9 to 42 ml/min (silver nitrate) and from 0.73 to 3.3 ml/min (silver iodide). The flow rates of the sodium bromide were allowed to fluctuate as needed to affect a monotonic pBr shift of 2.45 to 2.12 over the first 12 minutes, of 2.12 to 1.90 over the second 12 minutes, and of 1.90 to 1.67 over the last 12.8 minutes. This was followed by a 1.5 minute hold.

During the next 59 minutes the second growth stage took place (at 54° C.) during which solutions of 2.8 molar silver nitrate, and 3.0 molar sodium bromide, and a 0.16 molar suspension of silver iodide (Lippmann) were added to maintain a nominal iodide level of 3.2 mole %. The flow rates during this segment were increased from 10 to 39.6 ml/min (silver nitrate) and from 5.3 to 22.6 ml/min (silver iodide). The flow rates of the sodium bromide were allowed to fluctuate as needed to affect a monotonic pBr shift of 1.67 to 1.50. This was followed by a 1.5 minute hold.

During the next 34.95 minutes, the third growth stage took place during which solutions of 2.8 molar silver nitrate, 3.0 molar sodium bromide, and a 0.16 molar suspension of silver iodide (Lippmann) were added to maintain a nominal iodide level of 3.2 mole %. The flow rates during this segment were 39.6 ml/min (silver nitrate) and 22.6 ml/min (silver iodide). The temperature was linearly decreased to 35° C. during this segment. At the 23rd minute of this segment a 50 ml aqueous solution containing 0.85 mg of an Iridium dopant ($K_2[Ir(5\text{-}Br\text{-}thiazole)Cl_5]$) was added. The flow rate of the sodium bromide was allowed to fluctuate to maintain a constant pBr of 1.50.

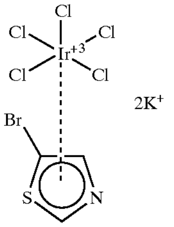

$K_2[IrCl_5(5\text{-bromo-thiazole})]$

A total of 8.5 moles of silver iodobromide (3.2% bulk iodide) were formed. The resulting emulsion was washed using ultrafiltration. Deionized lime-processed bone gelatin (326.9 g) was added along with a biocide and pH and pBr were adjusted to 6 and 2.5 respectively.

The resulting emulsion was examined by Scanning Electron Microscopy. Tabular grains accounted for greater than 99% of the total projected area. The mean ECD of the grains was 2.522 μm. The mean tabular thickness was 0.049 μm.

This emulsion was spectrally sensitized with 3.31 mmol of blue sensitizing dye SSD-1 per mole of silver halide. This dye quantity was split 80%/20% with the majority being added before chemical sensitization and the remainder afterwards. Chemical sensitization was carried out using 0.0085 mmol of sulfur sensitizer (compound SS-1a) and 0.00079 mmol per mole of silver halide of gold sensitizer (compound GS-1) at 60° C. for 6.3 minutes.

Preparation of Photothermographic Emulsion Formulations:

Component E (Samples 2-CS-1 and 2-CS-2): A portion of AgBZT emulsion C-4 prepared above and hydrated gelatin (35% gelatin/65% water) were placed in a beaker and heated to 50° C. for 15 minutes to form a homogeneous dispersion. A 5% aqueous solution of 3-methylbenzothiazolium iodide was added and heated for 15 minutes at 50° C. The sodium salt of benzotriazole was added and the dispersions were stirred again for 15 minutes at 50° C. Comparative samples 2-CS-1A and 2-CS-1B contained no compound T-1. Comparative samples 2-CS-2A and 2-CS-2B contained compound T-1 physically mixed with AgBZT as would be done in conventional procedures where toner and developer are added into the emulsion layer in solution or as a solid particle dispersion. For this sample a solution of Compound NaT-1 was added with stirring. 2.5 N sulfuric acid was added to all of the resulting melts at 40° C. to adjust the dispersion pH to 5.0. Addition of a solution of compound A-2 was followed by addition of a solution of ZONYL FS300 surfactant.

Component F (Inventive Sample 2-IN-3 and 2-IN-4): A portion of AgBZT/AgT-1 mixed crystal emulsions 1-7 and 1-9 prepared above and hydrated gelatin (35% gelatin/65% water) were used to prepare a dispersion similar to that of Component E except the addition of Compound T-1 was omitted.

Component G: A portion of the tabular-grain silver halide emulsion, prepared as described above, was placed in a beaker and melted by heating at 40° C.

Component H: Succinimide, 1,3-dimethylurea, and pentaerythritol listed in TABLE XI below were added to water and dissolved by sonication at 50° C. To this was added an aqueous dispersion of 29.2% L-ascorbic acid-6-O-palmitate, 2.92% polyvinyl alcohol (CELVOL® V 203S), 0.87% TRITON® X-114, and 0.03% BYK-022. The dispersion was prepared by circulating the materials in a Netzsch mill until the average particle size was 0.46 μm.

Topcoat Formulation:

An aqueous gelatin topcoat formulation was prepared.

Coating and Evaluation of Samples:

Components E, G, and H (Comparative) or Components F, G and H (Inventive) were mixed immediately before coating to form a photothermographic emulsion formulation. Each photothermographic emulsion and the topcoat formulation was dual knife coated onto a 7-mil (178 μm) transparent, blue-tinted poly(ethylene terephthalate) film support. The coating gap for the photothermographic layer was adjusted to achieve the dry coating weights shown below in TABLE XI. The dry coating weight of the gelatin topcoat layer was approximately 0.81 $g/m^2$. Samples were dried at 116° F. (47° C.) for 10 minutes.

TABLE XI

| Component | Compound | Dry Coating Weight [$g/m^2$] |
|---|---|---|
| E | AgBZT | 2.98 |
| E | Lime processed gelatin | 2.24 |
| E | Sodium benzotriazole | 0.09 |
| E | 3-Methyl-benzothiazolium iodide | 0.07 |
| E | Compound A-2 | 0.07 |
| E | Compound T-1 | 0.08 |
| F | AgBZT/AgT-1 mixed crystals | 3.06 |
| F | Lime processed gelatin | 2.24 |
| F | Sodium benzotriazole | 0.09 |
| F | 3-Methyl-benzothiazolium iodide | 0.07 |
| F | Compound A-2 | 0.07 |
| G | Silver (from silver halide emulsion) | 0.26 |
| H | Succinimide | 0.15 |
| H | 1,3-Dimethylurea | 0.33 |
| H | Pentaerythritol | 0.47 |
| H | L-ascorbic acid 6-O-palmitate | 3.79 |

The resulting photothermographic films were imagewise exposed for $10^{-2}$ seconds using an EG&G flash sensitometer equipped with a P-16 filter and a 0.7 neutral density filter. Following exposure, samples of each film were thermally developed using a heated flatbed processor for both 18 and 23 seconds at 150° C.

Sensitometry results, shown below in TABLE XII and TABLE XIII, demonstrate that photothermographic materials containing a co-precipitate of AgBZT/AgT-1 show high Dmax, low Dmin, and excellent photospeed.

As noted above, samples of each photothermographic material were also developed at 150° C. for 23 seconds rather than 18 seconds. This determines the process latitude of the photothermographic material. The results, shown below in TABLE XIII, demonstrate that materials incorporating the co-precipitate of AgBZT/AgT-1 exhibit less increase in Dmin than materials incorporating the AgBZT emulsion with AgT-1 physically added, when subjected to more severe development conditions.

Archival Stability: Imaged samples of each film were illuminated with 100 foot-candles (1076 lux) at 70° F. (21.2° C.) and 50% relative humidity for 2 hours. The samples were then sealed in a light and humidity tight aluminum bag and stored for 48 hours at 120° F. (48.9° C.) and 50% relative humidity. The Dmin of the samples was measured before and after storage. Two measurements were made on each sample. For the first measurement, the densitometer was equipped with a visible filter with a transmittance peak at about 530 nm. In the second measurement, the densitometer was fitted with a blue filter with a transmission peak at about 440 nm. The difference in density before and after storage using these filters is reported below in TABLE XIII as "Archival Stability" (A Blue and A Visible) and demonstrates that inventive samples containing a co-precipitate of AgBZT/AgT-1 showed less increase in Dmin (increased background density or "print-out") when subjected to accelerated aging conditions when compared to control samples not incorporating a co-precipitate of AgBZT/AgT-1.

TABLE XII

| Sample | Emulsion | Invention/ Comparative | Amount of NaT-1 in AgBZT [g/mol Ag] | Amount of T-1 in Co-precipitated AgBZT [g/mol Ag] |
|---|---|---|---|---|
| 2-CS-1A | C-4 | Comparative | 0.0 | 0.0 |
| 2-CS-1B | C-4 | Comparative | 0.0 | 0.0 |
| 2-CS-2A | C-4 | Comparative | 6.0 | 0.0 |
| 2-CS-2B | C-4 | Comparative | 6.0 | 0.0 |
| 2-IN-3A | I-9 | Inventive | 0.0 | 4.0 |
| 2-IN-3B | I-9 | Inventive | 0.0 | 4.0 |
| 2-lN-4A | I-7 | Invention | 0.0 | 6.0 |
| 2-IN-4B | I-7 | Invention | 0.0 | 6.0 |

TABLE XIII

| Sample | Development Time [seconds] | Dmin | Dmax | Spd-1 | Spd-2 | Archival Stability Δ Blue | Archival Stability Δ Visible |
|---|---|---|---|---|---|---|---|
| 2-CS-1A | 18 | 0.27 | 0.51 | **** | **** | +3.41 | +2.08 |
| 2-CS-1B | 23 | 0.28 | 0.56 | **** | **** | NM | NM |
| 2-CS-2A | 18 | 0.33 | 3.18 | 4.96 | 4.65 | +0.65 | +0.56 |
| 2-CS-2B | 23 | 0.41 | 3.38 | 5.06 | 4.79 | NM | NM |
| 2-IN-3A | 18 | 0.27 | 2.48 | 4.92 | 4.43 | +1.48 | +1.29 |
| 2-1N-3B | 23 | 0.27 | 3.13 | 5.07 | 4.75 | NM | NM |
| 2-IN-4A | 18 | 0.30 | 3.08 | 5.11 | 4.78 | +0.55 | +0.47 |
| 2-IN-4B | 23 | 0.32 | 3.31 | 5.22 | 4.96 | NM | NM |

****Could not be measured.
NM - Was not measured.

Example 3

Preparation of Photothermographic Materials Containing Phenylmercaptotetrazole (PMT Compounds)

The following example demonstrates that phenylmercaptotetrazole (PMT) and 1-(3-acetamidophenyl)-5-mercaptotetrazole (Ac-PMT), two compounds taught to be useful as co-precipitated silver sources in U.S. Pat. No. 6,576,414 (Irving et al.) and U.S. Pat. No. 6,548,236 (Irving et al.), but whose non-silver parent compounds are not toners in photothermographic materials, do not function as toner-release agents in photothermographic materials.

Co-precipitated crystals of silver benzotriazole and silver phenylmercaptotriazole (AgBZT/AgPMT) or silver benzotriazole and 1-(3-acetamidophenyl)$_5$-mercaptotetrazole (AgBZT/AgAc-PMT) were prepared in a manner similar to that described for emulsion I-2 in Example 1 above, except that a portion of the BZT was replaced with PMT. Three samples were prepared for each PMT compound using PMT levels of 0%, 1%, and 2% of total silver.

The AgBZT/AgPMT/AgT-1 emulsions were prepared as core/shell crystals, as taught in U.S. Pat. Nos. 6,576,414 and 6,548,236 (both noted above) with an inner core of AgBZT, followed by a shell of AgPMT, followed by a surface shell of AgT-1, spanning the last 2.6% of Ag.

The AgBZT/AgAc-PMT+AgT-1 emulsions were prepared as core/shell crystals, also as taught in U.S. Pat. Nos. 6,576,414 and 6,548,236 (both noted above), with an inner core of AgBZT, followed by a mixed shell containing both AgAc-PMT and AgT-1, where the amount of AgT-1 corresponds to 2.6% of the total Ag.

Photothermographic formulations were prepared, coated, dried, and imaged in a manner also similar to that described in Example 2. No topcoat was used. Samples containing 0% of PMT derivatives contained only co-precipitated AgBZT/AgT-1 and were essentially similar to Inventive Sample 2-IN-4 of Example 2.

The results, shown below in TABLES XIV, XV, and XVI demonstrate that the presence of a phenylmercaptotetrazole (PMT) in the crystal actually provides materials with higher Dmin and lower Dmax, Speed-1, Speed-2, and Average Contrast (AC-1) than materials containing only AgBZT/AgT-1.

Non-imaged samples of each material were stored in a black polyethylene bag for 2 months at ambient room temperature and relative humidity to determine their Natural Age Keeping properties. The samples were then imaged and compared with the freshly imaged samples.

The results, shown below in TABLES XIV, XV, and XVI demonstrate that photothermographic materials incorporating mixed crystals of AgBZT/AgPMT/AgT-1 or AgBZT/AgAc-PMT+AgT-1, have poorer Natural Age Keeping and exhibit a greater increase in Dmin, and a greater decrease in Dmax, Speed-2, and Average Contrast-1 upon Natural Age Keeping than photothermographic materials incorporating co-precipitated particles of AgBZT/AgT-1.

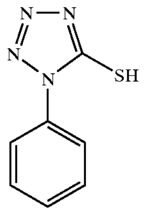

(PMT)

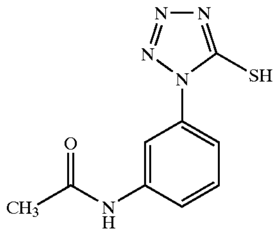

(Ac-PMT)

TABLE XIV

| Sample | | Invention/ Comparative | Initial Dmin | NAK 2 Month Dmin | NAK 2 Month ΔDmin | Initial Dmax | NAK 2 Month Dmax | NAK 2 Month ΔDmax |
|---|---|---|---|---|---|---|---|---|
| | Amount of PMT (%) | | | | | | | |
| 3-IN-1 | 0 | Invention | 0.283 | 0.298 | +0.015 | 3.119 | 2.834 | −0.285 |
| 3-CS-2 | 1 | Comparative | 0.294 | 0.305 | +0.011 | 2.820 | 2.314 | −0.505 |
| 3-CS-3 | 2 | Comparative | 0.290 | 0.326 | +0.036 | 2.101 | 1.715 | −0.386 |
| | Amount of Ac-PMT (%) | | | | | | | |
| 3-IN-4 | 0 | Invention | 0.278 | 0.300 | +0.022 | 3.243 | 2.688 | −0.554 |
| 3-CS-5 | 1 | Comparative | 0.288 | 0.296 | +0.007 | 2.399 | 1.201 | −1.198 |
| 3-CS-6 | 2 | Comparative | 0.294 | 0.296 | +0.003 | 1.423 | 1.149 | −0.275 |

TABLE XV

| Sample | | Invention/ Comparative | Initial Spd-1 | NAK 2 Month Spd-1 | NAK 2 Month ΔSpd-1 | Initial Spd-2 | NAK 2 Month Spd-2 | NAK 2 Month ΔSpd-2 |
|---|---|---|---|---|---|---|---|---|
| | Amount of PMT (%) | | | | | | | |
| 3-IN-1 | 0 | Invention | 5.006 | 5.210 | +0.204 | 4.709 | 4.774 | +0.065 |
| 3-CS-2 | 1 | Comparative | 5.048 | 5.202 | +0.154 | 4.688 | 4.628 | −0.060 |
| 3-CS-3 | 2 | Comparative | 4.792 | 4.956 | +0.164 | 4.097 | 3.767 | −0.330 |
| | Amount of Ac-PMT (%) | | | | | | | |
| 3-IN-4 | 0 | Invention | 5.157 | 5.127 | +0.022 | 4.891 | 4.632 | −0.259 |
| 3-CS-5 | 1 | Comparative | 5.010 | 4.582 | +0.428 | 4.482 | **** | **** |
| 3-CS-6 | 2 | Comparative | 4.558 | 3.614 | +0.944 | 3.332 | **** | **** |

TABLE XVI

| Sample | Amount of PMT (%) | Invention/ Comparative | Initial AC-1 | NAK 2 Month AC-1 | 2 Month Δ AC-1 |
|---|---|---|---|---|---|
| 3-IN-1 | 0 | Invention | 3.507 | 1.869 | −1.638 |
| 3-CS-2 | 1 | Comparative | 1.978 | 0.934 | −1.044 |
| 3-CS-3 | 2 | Comparative | *** | *** | *** |
| | Amount of Ac-PMT (%) | | | | |
| 3-IN-3 | 0 | Invention | 3.918 | 1.400 | −1.638 |
| 3-CS-4 | 1 | Comparative | 1.354 | **** | **** |
| 3-CS-5 | 2 | Comparative | **** | **** | **** |

****Could not be measured.

The invention has been described in detail with particular reference to certain preferred embodiments thereof, but it will be understood that variations and modifications can be effected within the spirit and scope of the invention.

What is claimed is:

1. A co-precipitate particle comprising first and second organic silver salts, said first organic silver salt comprising a silver salt of a nitrogen-containing heterocyclic compound containing an imino group, and said second organic silver salt being uniformly distributed throughout the volume of said particle and comprising a silver salt of a mercaptotriazole, wherein said second organic silver salt comprises a silver salt of a mercaptotriazole having the following Structure (I):

(I)

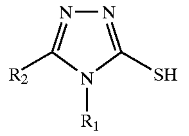

wherein $R_1$ and $R_2$ independently represent hydrogen, an alkyl group, an alkenyl group, a cycloalkyl group, an aromatic or non-aromatic heterocyclyl group, an amino or amide group, an aryl group, or a $Y_1$—$(CH_2)_k$— group wherein $Y_1$ is an aryl group or an aromatic or non-aromatic heterocyclyl group, and k is 1–3, or $R_1$ and $R_2$ taken together can form a 5- to 7-membered aromatic or non-aromatic nitrogen-containing heterocyclic ring, or still again, $R_1$ or $R_2$ can represent a divalent linking group linking two mercaptotriazole groups, and $R_2$ may further represent carboxy or its salts, provided that $R_1$ and $R_2$ are not simultaneously hydrogen, and when $R_1$ is an unsubstituted phenyl group, $R_2$ is not hydrogen.

2. The co-precipitate particle of claim 1 having an aspect ratio of at least 2 and said first organic silver salt comprises a silver salt of a benzotriazole.

3. The co-precipitate particle of claim 1 wherein $R_1$ is an alkyl or phenyl group and $R_2$ is hydrogen.

4. The co-precipitate particle of claim 1 that has an aspect ragtio of at least 3 and a width index for particle diameter of 1.25 or less.

5. The co-precipitate particle of claim 1 wherein the molar ratio of said first organic silver salt to said second organic silver salt is from about 100:1 to about 15:1.

6. A co-precipitate particle comprising first and second organic silver salts, said first organic silver salt comprising a silver salt of a benzotriazole, and said second organic silver salt comprising a silver salt of a mercaptotriazole represented by the following Structure (T-1), wherein the molar ratio of said first organic silver salt to said second organic silver salt is from about 100:1 to about 15:1, and at least 95 mol % of said second organic silver salt is present within a localized portion that is from about 90 to 100 volume % of said co-precipitate particle wherein 100 volume % represents the outer surface of said co-precipitate particle:

(T-1)

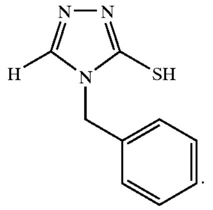

7. A method of making a co-precipitate particle of first and second organic silver salts, said first organic silver salt comprising a silver salt of a nitrogen-containing heterocyclic compound containing an imino group, and said second organic silver salt uniformly distributed throughout the volume of said particle and comprising a silver salt of a mercaptotriazole, said method comprising:

A) preparing aqueous solution A containing a nitrogen-containing heterocyclic compound containing an imino group, A') preparing aqueous solution A' containing a mercaptotriazole, wherein solutions A and A' are the same solution, B) preparing aqueous solution B of silver nitrate, and C) simultaneously adding said aqueous solutions A and B to a reaction vessel containing an aqueous dispersion of a hydrophilic polymer binder or a water-dispersible polymer latex binder that has a pH of from about 7.5 to about 10, via controlled double-jet precipitation, while maintaining a constant temperature of from about 30 to about 75° C., a constant pH, and a constant vAg equal to or greater than −50 mV in said reaction vessel, thereby preparing in said reaction vessel a dispersion of said hydrophilic polymer binder or said water-dispersible polymer latex binder and co-precipitate particles of said first and second silver salts, and said hydrophilic polymer binder or said water-dispersible polymer latex binder being present in said dispersion in an amount of from about 2 to about 10 weight %, wherein said second organic silver salt comprises a silver salt of a mercaptotriazole having the following Structure (I):

(I)

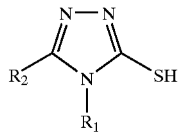

wherein $R_1$ and $R_2$ independently represent hydrogen, an alkyl group, an alkenyl group, a cycloalkyl group, an aromatic or non-aromatic heterocyclyl group, an amino or amide group, an aryl group, or a $Y_1$—$(CH_2)_k$— group wherein $Y_1$ is an aryl group or an aromatic or non-aromatic heterocyclyl group, and k is 1–3, or $R_1$ and $R_2$ taken together can form a 5- to 7-membered aromatic or non-aromatic nitrogen-containing heterocyclic ring, or still again, $R_1$ or $R_2$ can represent a divalent linking group linking two mercaptotriazole groups, and $R_2$ may further represent carboxy or its salts, provided that $R_1$ and $R_2$ are not simultaneously hydrogen, and when $R_1$ is an unsubstituted phenyl group, $R_2$ is not hydrogen.

8. The method of claim 7 wherein the ratio of the molar flow rate ($A_1$) of the nitrogen-containing heterocyclic compound containing an imino group in Solution A to the total Ag moles precipitated is from about 0.004 to about 0.04 mol/min/mol Ag and the ratio of the molar flow rate ($B_1$) of Solution B to the total Ag moles precipitated is from about 0.004 to about 0.04 mol/min/mol Ag.

9. The method of claim 7 wherein solutions A and A' are different and solution A' is added to said reaction vessel such that the ratio of molar flow rate ($A'_1$) of the mercaptotriazole in Solution A' to the total Ag moles precipitated is from about 0.004 to about 0.04 mol/min/mol Ag and the ratio of the molar flow rate of Solution B to the total Ag moles precipitated is from about 0.004 to about 0.04 mol/min/mol Ag.

10. The method of claim 7 wherein said nitrogen-containing heterocyclic compound containing an imino group is present in said Solution A at a concentration of at least 0.1 mol/l and said mercaptotriazole is present in said Solution A at a concentration of at least 0.1 mol/l.

11. The method of claim 7 wherein the pH in said reaction vessel is maintained at from about 7.5 to about 10, and said vAg is maintained in said reaction vessel from about −50 to about 0 mV.

12. The method of claim 7 wherein said co-precipitate particle has an aspect ratio of at least 2, said first organic silver salt comprises a silver salt of a benzotriazole, and said second organic silver salt comprises a silver salt of a mercaptotriazole that is the silver salt of Compound T-1, (T-1)

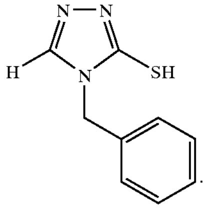

13. A method of making a co-precipitate comprising:

A) preparing aqueous solution A containing a benzotriazole at a concentration of from about 2 to about 4 mol/l, A') preparing aqueous solution A' that is different from solution A and contains a mercaptotriazole of Structure (T-1) at a concentration of from about 0.5 to about 3 mol/l, B) preparing aqueous solution B of silver nitrate, and C) simultaneously adding said aqueous solutions A and B to a reaction vessel containing an aqueous dispersion of a hydrophilic polymer binder or a water-dispersible polymer latex binder that has a pH of from about 7.5 to about 10, via controlled double-jet precipitation, while maintaining a constant temperature of from about 30 to about 75° C., a constant pH, and a constant vAg equal to or greater than −50 mV in said reaction vessel, E) adding solution A' to said reaction vessel during step C but only after at least 75 volume % of solution B has been added to said reaction vessel, thereby preparing in said reaction vessel a dispersion of said hydrophilic polymer binder or said water-dispersible polymer latex binder and particles of the co-precipitate of said first and second organic silver salts, and said hydrophilic polymer binder or said water-dispersible polymer latex binder being present in said dispersion in an amount of from about 2 to about 10 weight %, (T-1)

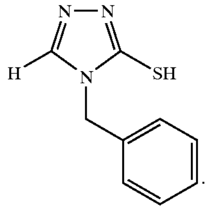

14. A black-and-white, non-photosensitive thermographic material comprising a support and having thereon at least one non-photosensitive thermally developable imaging layer comprising a hydrophilic polymer binder or a water-dispersible polymer latex binder and in reactive association:

a. a non-photosensitive source of reducible silver ions, and b. a reducing agent for said reducible silver ions, wherein said non-photosensitive source of reducible silver ions predominantly comprises a co-precipitate particle comprising first and second organic silver salts, said first organic silver salt comprising a silver salt of a nitrogen-containing heterocyclic compound containing an imino group, and said second organic silver salt being uniformly distributed throughout the volume of said particle and comprising a silver salt of a mercaptotriazole.

15. A black-and-white photothermographic material comprising a support and having thereon at least one thermally developable imaging layer comprising a hydrophilic polymer binder or a water-dispersible polymer latex binder and in reactive association:

a. a photosensitive silver halide that is spectrally sensitized to a wavelength of from about 300 to about 450 nm, b. a non-photosensitive source of reducible silver ions, and c. a reducing agent for said reducible silver ions, wherein said non-photosensitive source of reducible silver ions predominantly comprises a co-precipitate particle comprising first and second organic silver salts, said first organic silver salt comprising a silver salt of a nitrogen-containing heterocyclic compound containing an imino group, and said second organic silver salt being uniformly distributed throughout the volume of said particle and comprising a silver salt of a mercaptotriazole.

16. The material of claim 15 wherein first organic silver salt comprises a silver salt of a benzotriazole and said second organic silver salt comprises a silver salt of a mercaptotriazole having the following Structure (I):

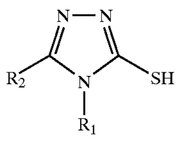

(I)

wherein $R_1$ and $R_2$ independently represent hydrogen, an alkyl group, an alkenyl group, a cycloalkyl group, an aromatic or non-aromatic heterocyclyl group, an amino or amide group, an aryl group, or a $Y_1$—$(CH_2)_k$— group wherein $Y_1$ is an aryl group or an aromatic or non-aromatic heterocyclyl group, and k is 1–3, or $R_1$ and $R_2$ taken together can form a 5- to 7-membered aromatic or non-aromatic nitrogen-containing heterocyclic ring, or still again, $R_1$ or $R_2$ can represent a divalent linking group linking two mercaptotriazole groups, and $R_2$ may further represent carboxy or its salts, provided that $R_1$ and $R_2$ are not simultaneously hydrogen, and when $R_1$ is an unsubstituted phenyl group, $R_2$ is not hydrogen.

17. The material of claim 15 wherein said mercaptotriazole is a silver salt of one or more of the following Compounds T-1 through T-59:

(T-1)

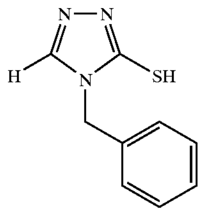

(T-2)

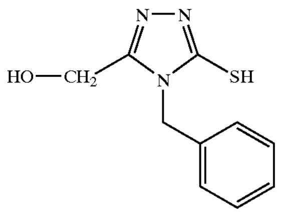

-continued (T-3)

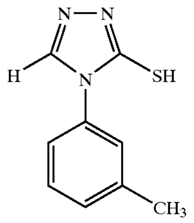

(T-4)

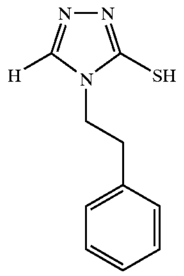

(T-5)

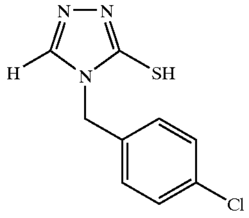

(T-6)

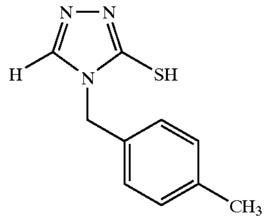

(T-7)

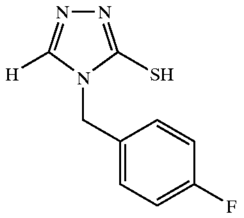

(T-8)

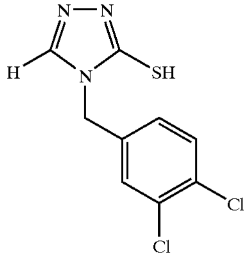

-continued
(T-9)
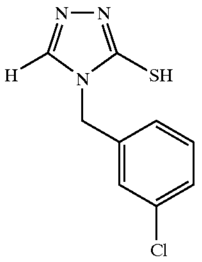
(T-10)
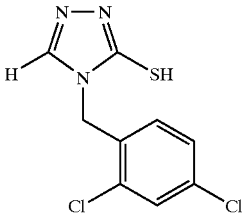
(T-11)
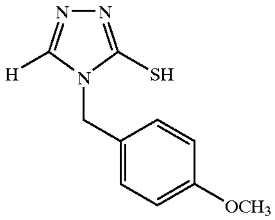
(T-12)
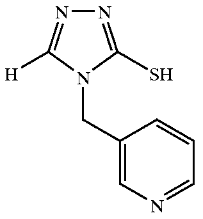
(T-13)
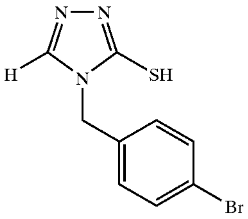
(T-14)
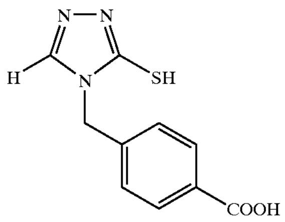
(T-15)
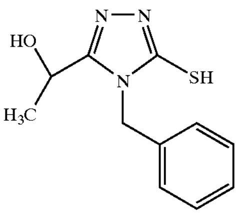
-continued
(T-16)
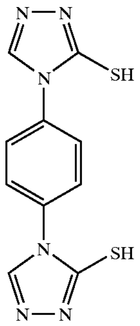
(T-17)
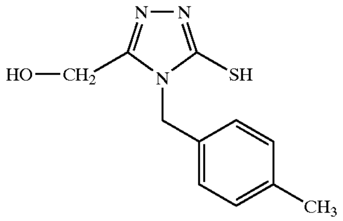
(T-18)
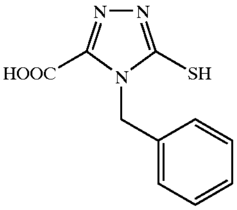
(T-19)
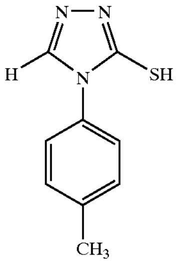
(T-20)
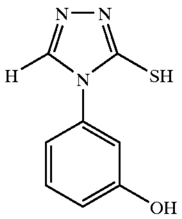
(T-21)
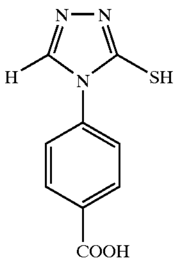

-continued
(T-22)
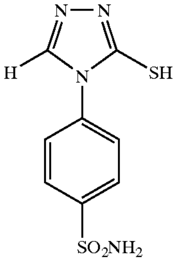
(T-23)
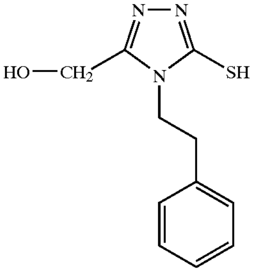
(T-24)
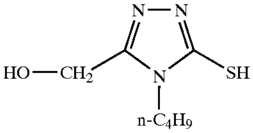
(T-25)
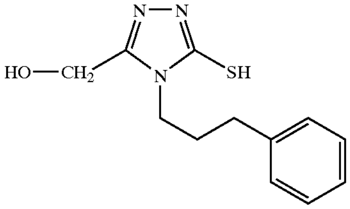
(T-26)
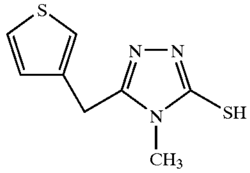
(T-27)
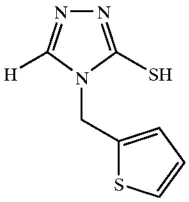
(T-28)
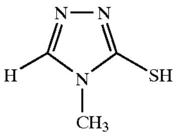
(T-29)
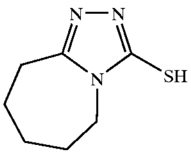
-continued
(T-30)
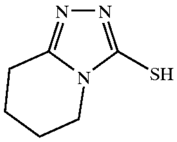
(T-31)
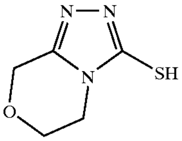
(T-32)
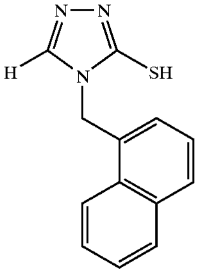
(T-33)
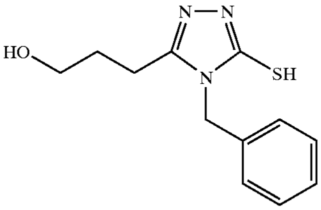
(T-34)
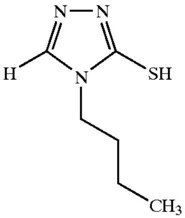
(T-35)
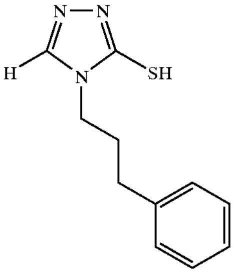
(T-36)
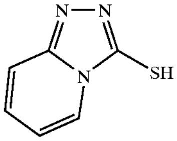
(T-37)
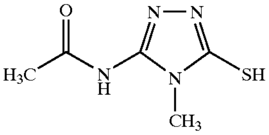

-continued
(T-38)
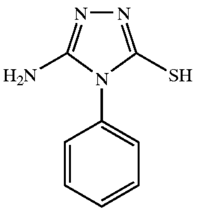
(T-39)
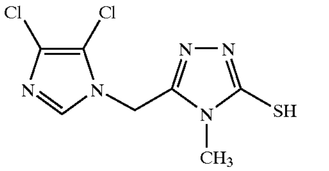
(T-40)
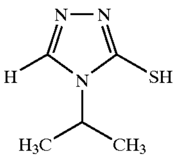
(T-41)
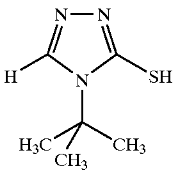
(T-42)
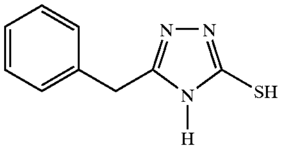
(T-43)
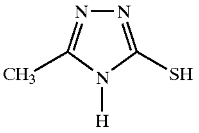
(T-44)
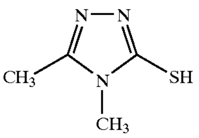
(T-45)
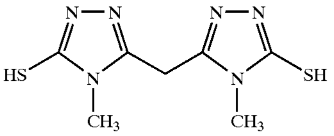
(T-46)
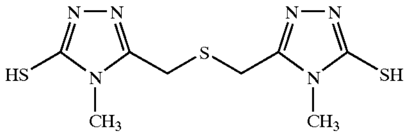
-continued
(T-47)
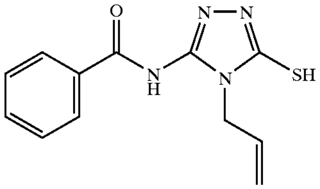
(T-48)
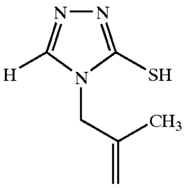
(T-49)
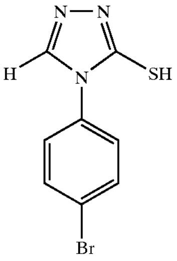
(T-50)
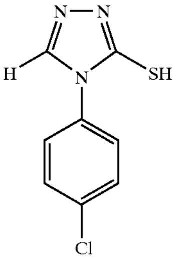
(T-51)
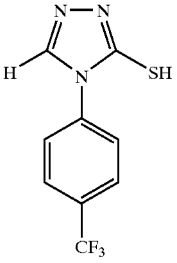
(T-52)
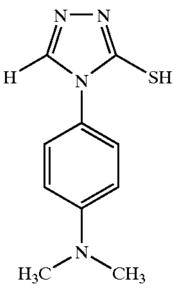

-continued (T-53

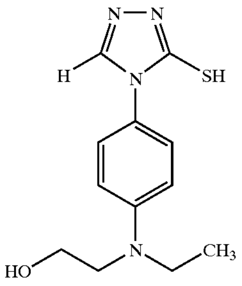

(T-54)

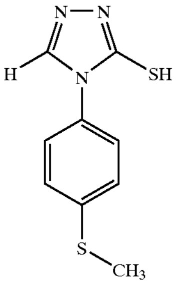

(T-55)

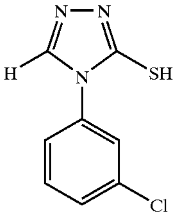

(T-56)

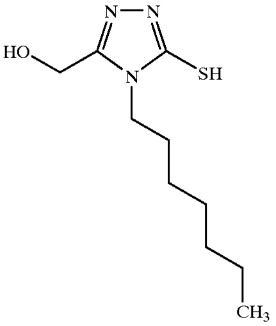

(T-57)

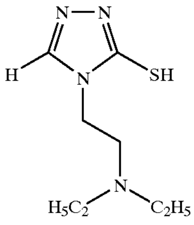

(T-58)

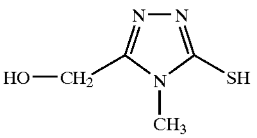

-continued (T-59)

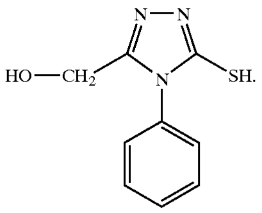

18. A black-and-white photothermographic material comprising a support and having thereon at least one thermally developable imaging layer comprising a hydrophilic polymer binder or a water-dispersible polymer latex binder and in reactive association:

a. a photosensitive silver halide, b. a non-photosensitive source of reducible silver ions, and c. a reducing agent for said reducible silver ions, wherein said non-photosensitive source of reducible silver ions predominantly comprises a co-precipitate particle comprising first and second organic silver salts, said first organic silver salt comprising a silver salt of a nitrogen-containing heterocyclic compound containing an imino group, and said second organic silver salt comprising a silver salt of a mercaptotriazole, wherein said first organic silver salt comprising a silver salt of a benzotriazole, and said second organic silver salt is present within a localized portion that is from about 75 to 100 volume % of said co-precipitate particle wherein 100 volume % represents its outer surface and comprises a silver salt of a mercaptotriazole that is the silver salt of Compound (T-1), (T-1)

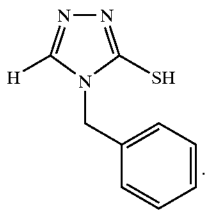

19. The material of claim 18 wherein said second organic silver salt is present within a localized portion that is from about 90 to 100 volume % of said co-precipitate particle wherein 100 volume % represents its outer surface, and said co-precipitate particle has an aspect ratio of at least 3 and a width index for particle diameter of 1.25 or less.

20. A black-and-white photothermographic material comprising a support and having thereon at least one thermally developable imaging layer comprising a hydrophilic polymer binder or a water-dispersible polymer latex binder and in reactive association:

a. a photosensitive silver halide present as ultrathin tabular grains, b. a non-photosensitive source of reducible silver ions, and c. a reducing agent for said reducible silver ions, wherein said non-photosensitive source of reducible silver ions comprises a co-precipitate particle comprising first and second organic silver salts, said first organic silver salt comprising a silver salt of a nitrogen-containing heterocyclic compound containing an imino group, and said second organic silver salt being uniformly distributed throughout the volume of said particle and comprising a silver salt of a mercaptotriazole.

21. The material of claim 20 wherein said first organic silver salt comprises a silver salt of a benzotriazole and said second organic silver salt comprises a silver salt of a mercaptotriazole having the following Structure (I):

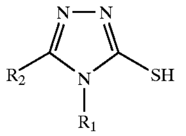

(I)

wherein $R_1$ and $R_2$ independently represent hydrogen, an alkyl group, an alkenyl group, a cycloalkyl group, an aromatic or non-aromatic heterocyclyl group, an amino or amide group, an aryl group, or a $Y_1-(CH_2)_k-$ group wherein $Y_1$ is an aryl group or an aromatic or non-aromatic heterocyclyl group, and k is 1–3, or $R_1$ and $R_2$ taken together can form a 5- to 7-membered aromatic or non-aromatic nitrogen-containing heterocyclic ring, or still again, $R_1$ or $R_2$ can represent a divalent linking group linking two mercaptotriazole groups, and $R_2$ may further represent carboxy or its salts, provided that $R_1$ and $R_2$ are not simultaneously hydrogen, and when $R_1$ is an unsubstituted phenyl group, $R_2$ is not hydrogen.

22. The material of claim 20 wherein said co-precipitate has an aspect ratio of at least 3 and a width index for particle diameter of 1.25 or less.

23. The material of claim 20 wherein said reducing agent is an ascorbic acid or reductone.

24. The material of claim 23 wherein said reducing agent is a fatty acid ester of ascorbic acid, and said hydrophilic binder is gelatin, a gelatin derivative, or a cellulosic material, and said one or more thermally developable imaging layers has a pH of less than 7.

25. A black-and-white photothermographic material comprising a support having on a frontside thereof, a) one or more frontside thermally developable imaging layers comprising a hydrophilic polymer binder or a water-dispersible polymer latex binder, and in reactive association, a photosensitive silver halide, a non-photosensitive source of reducible silver ions, and a reducing agent for said non-photosensitive source of reducible silver ions, b) said material comprising on the backside of said support, one or more backside thermally developable imaging layers having the same or different composition as said frontside thermally developable imaging layers, and c) optionally, an outermost protective layer disposed over said one or more thermally developable imaging layers on either or both sides of said support, wherein said non-photosensitive source of reducible silver ions comprises a co-precipitate particle comprising first and second organic silver salts, said first organic silver salt comprising a silver salt of a nitrogen-containing heterocyclic compound containing an imino group, and said second organic silver salt comprising a silver salt of a mercaptotriazole being uniformly distributed throughout the volume of said particle.

26. The material of claim 25 wherein said co-precipitate comprises rod-shaped particles that have a length of from about 0.1 to about 0.5 μm, a diameter of from about 0.03 to about 0.07 μm, an aspect ratio of from about 3 to about 10, and a width index for particle diameter of from about 1.1 to about 1.2.

27. The material of claim 25 wherein said photosensitive silver halide is sensitive to electromagnetic radiation of from about 300 to about 450 nm.

28. The material of claim 25 wherein said first organic silver salt is a silver benzotriazole and said silver salt of said mercaptotriazole is represented by a silver salt of the following Structure (I):

(I)

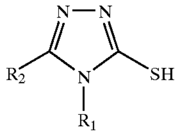

wherein $R_1$ and $R_2$ independently represent hydrogen, an alkyl group, an alkenyl group, a cycloalkyl group, an aromatic or non-aromatic heterocyclyl group, an amino or amide group, an aryl group, or a $Y_1-(CH_2)_k-$ group wherein $Y_1$ is an aryl group or an aromatic or non-aromatic heterocyclyl group, and k is 1–3, or $R_1$ and $R_2$ taken together can form a 5- to 7-membered aromatic or non-aromatic nitrogen-containing heterocyclic ring, or still again, $R_1$ or $R_2$ can represent a divalent linking group linking two mercaptotriazole groups, and $R_2$ may further represent carboxy or its salts, provided that $R_1$ and $R_2$ are not simultaneously hydrogen.

29. A black-and-white photothermographic material comprising a support having on a frontside thereof, a) one or more frontside thermally developable imaging layers comprising a hydrophilic polymer binder or a water-dispersible polymer latex binder, and in reactive association, a photosensitive silver halide, a non-photosensitive source of reducible silver ions, and a reducing agent for said non-photosensitive source of reducible silver ions, b) said material comprising on the backside of said support, one or more backside thermally developable imaging layers having the same or different composition as said frontside thermally developable imaging layers, and c) optionally an outermost protective layer disposed over said one or more thermally developable imaging layers on either or both sides of said support, wherein said non-photosensitive source of reducible silver ions comprises a co-precipitate particle comprising first and second organic silver salts, said first organic silver salt comprising a silver salt of a nitrogen-containing heterocyclic compound containing an imino group, and said second organic silver salt being uniformly distributed throughout the volume of said particle and comprising a silver salt of a mercaptotriazole, wherein said thermally developable imaging layers on both sides of said support are essentially the same, said reducing agent is a fatty acid ester of ascorbic acid, said photosensitive silver halide is present as tabular grains of silver bromide or silver iodobromide, said first organic silver salt is silver benzotriazole, and said silver salt of said mercaptotriazole is the silver salt of Compound T-1, (T-1)

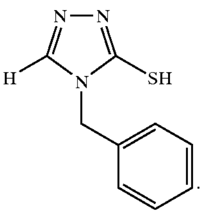

30. The material of claim 25 wherein each of said thermally developable imaging layers on both sides of said support has been coated out of an aqueous formulation comprising an aqueous solvent.

31. The black-and-white photothermographic material of claim 29 wherein at least 95 mol % of said second organic silver salt is present within a localized portion that is from about 95 to 100 volume % of said co-precipitate particle wherein 100 volume % represents its outer surface.

32. The black-and-white photothermographic material of claim 31 wherein at least part of the outer surface of said co-precipitate particle is covered by said second organic silver salt.

33. A method of forming a visible image comprising:

A) imagewise exposing the photothermographic material of claim 15 to form a latent image, B) simultaneously or sequentially, heating said exposed photothermographic material to develop said latent image into a visible image.

34. A method of forming a visible image comprising:

A) imagewise exposing the photothermographic material of claim 18 to form a latent image, B) simultaneously or sequentially, heating said exposed photothermographic material to develop said latent image into a visible image.

35. The method of claim 34 wherein said thermally developable material comprises a transparent support, and said image-forming method further comprises:

C) positioning said exposed and thermally-developed material with the visible image therein between a source of imaging radiation and an imageable material that is sensitive to said imaging radiation, and D) exposing said imageable material to said imaging radiation through the visible image in said exposed and thermally-developed material to provide an image in said imageable material.

36. The method of claim 34 wherein said imagewise exposing is carried out using visible or X-radiation.

37. The method of claim 34 wherein said photothermographic material is arranged in association with one or more phosphor intensifying screens during imaging.

38. The method of claim 34 further comprising using said exposed photothermographic material for medical diagnosis.

39. An imaging assembly comprising the photothermographic material of claim 18 that is arranged in association with one or more phosphor intensifying screens.

40. An imaging assembly comprising the photothermographic material of claim 25 that is arranged in association with a phosphor intensifying screens on each side thereof.

41. The imaging assembly of claim 40 wherein said photothermographic material comprises a photosensitive silver halide that is spectrally sensitive to a wavelength of from about 360 to about 420 nm, and said phosphor intensifying screens are capable of emitting radiation in the range of from about 360 to about 420 nm.

42. A dispersion of a hydrophilic polymer binder or a water-dispersible polymer latex binder and one or more co-precipitate particles comprising first and second organic silver salts, said first organic silver salt comprising a silver salt of a nitrogen-containing heterocyclic compound containing an imino group, and said second organic silver salt being uniformly distributed throughout the volume of said particle and comprising a silver salt of a mercaptotriazole, and said hydrophilic polymer binder or said water-dispersible polymer latex binder being present in said dispersion in an amount of from about 2 to about 10 weight %, wherein said mercaptotriazole is represented by the following Structure (I):

(I)

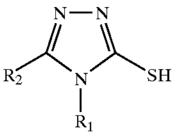

wherein $R_1$ and $R_2$ independently represent hydrogen, an alkyl group, an alkenyl group, a cycloalkyl group, an aromatic or non-aromatic heterocyclyl group, an amino or amide group, an aryl group, or a $Y_1$—$(CH_2)_k$— group wherein $Y_1$ is an aryl group or an aromatic or non-aromatic heterocyclyl group, and k is 1–3, or $R_1$ and $R_2$ taken together can form a 5- to 7-membered aromatic or non-aromatic nitrogen-containing heterocyclic ring, or still again, $R_1$ or $R_2$ can represent a divalent linking group linking two mercaptotriazole groups, and $R_2$ may further represent carboxy or its salts, provided that $R_1$ and $R_2$ are not simultaneously hydrogen, and when $R_1$ is an unsubstituted phenyl group, $R_2$ is not hydrogen.

43. The dispersion of claim 42 wherein said first organic silver salt is silver benzotriazole, said mercaptotriazole is the silver salt of Compound T-1, and said hydrophilic binder is gelatin or a gelatin derivative, (T-1)

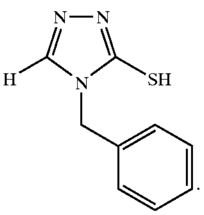

44. The material of claim 15 wherein at least 75 weight % of the total binders in said at least one thermally developable imaging layer is gelatin or a gelatin derivative, and said material further comprises a protective topcoat layer in which at least 75 weight % of the total binders is gelatin or a gelatin derivative.

45. The material of claim 25 comprising an outermost protective layer disposed over said one or more thermally developable imaging layers on both sides of said support, and at least 75 weight % of the total binders in both said outermost protective layers and said one or more thermally developable imaging layers on both sides of said support is gelatin or a gelatin derivative.

46. The material of claim 15 further comprising a 2-alkylphthalazinium salt.

47. The material of claim 46 wherein said 2-alkylphthalazinium salt is 2-butylphthalazinium chloride.

* * * * *